United States Patent
Itokawa

(10) Patent No.: US 6,636,644 B1
(45) Date of Patent: Oct. 21, 2003

(54) IMAGE PROCESSING SUITABLE FOR USE WITH MPEG4, AVOIDING FALSE-COLOR PROBLEMS IN EXTRACTION OF PORTIONS OF AN IMAGE

(75) Inventor: Osamu Itokawa, Akishima (JP)

(73) Assignee: Canon Kabushiki Kaishi, Tokyo (JP)

( * ) Notice: Subject to any disclaimer, the term of this patent is extended or adjusted under 35 U.S.C. 154(b) by 0 days.

(21) Appl. No.: 09/452,818

(22) Filed: Dec. 1, 1999

(30) Foreign Application Priority Data

Dec. 1, 1998 (JP) .......................................... 10-342183
Mar. 24, 1999 (JP) .......................................... 11-080461

(51) Int. Cl.[7] .................................................. G06K 9/36
(52) U.S. Cl. ................... 382/243; 382/166; 375/240.08
(58) Field of Search ................................. 382/232–243, 382/280, 162–167; 375/240.01–240.28

(56) References Cited

U.S. PATENT DOCUMENTS

| 5,812,787 A | * | 9/1998 | Astle .......................... 382/236 |
| 5,978,034 A | * | 11/1999 | Hosaka ........................ 382/243 |
| 5,978,510 A | * | 11/1999 | Chung et al. ............... 382/238 |
| 5,991,453 A | * | 11/1999 | Kweon et al. .............. 382/250 |
| 6,088,486 A | * | 7/2000 | Yamaguchi et al. ........ 382/243 |
| 6,125,142 A | * | 9/2000 | Han ......................... 375/240.1 |
| 6,208,693 B1 | * | 3/2001 | Chen et al. ............ 375/240.24 |
| 6,307,885 B1 | * | 10/2001 | Moon et al. ........... 375/240.08 |

FOREIGN PATENT DOCUMENTS

EP      0932306 A2  *  7/1999  ............ H04N/7/30

* cited by examiner

Primary Examiner—Jingge Wu
(74) Attorney, Agent, or Firm—Fitzpatrick, Cella, Harper & Scinto

(57) ABSTRACT

In a chroma subsampled image, since an extracted object contains a color outside the object upon extracting the object, the color of an object boundary portion becomes unnatural upon reproduction, and coding efficiency lowers.

In this invention, the object is extracted while determining pixels on the object boundary as those outside the object. Upon object extraction, the value of a chroma pixels that extends across the object boundary is calculated based on the chroma values of its surrounding pixels.

With this process, the coding efficiency can be improved, and natural color reproduction can be realized, since chroma data that extends across the boundary is synthesized on the basis of the ratio between background data and object data upon object synthesis.

13 Claims, 29 Drawing Sheets

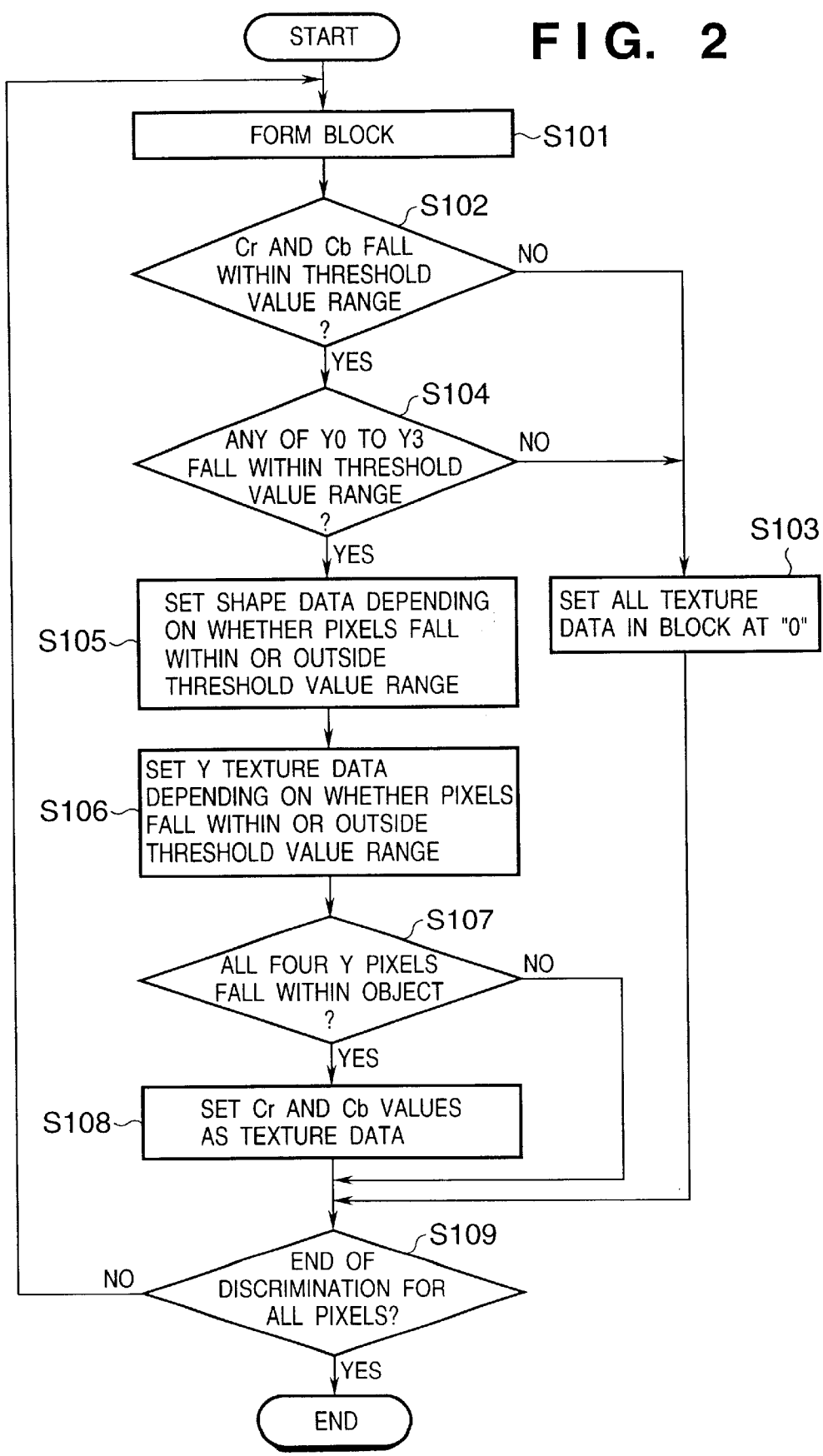

F I G. 18
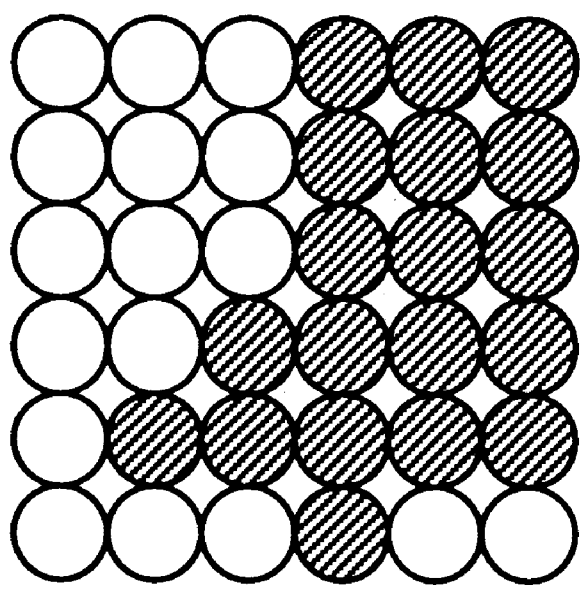

1301 HORIZONTAL PADDING DATA
1302 TEXTURE DATA
1303 VERTICAL PADDING DATA

1304 HORIZONTAL PADDING DATA
1305 TEXTURE DATA
1306 VERTICAL PADDING DATA

IMAGE PROCESSING SUITABLE FOR USE WITH MPEG4, AVOIDING FALSE-COLOR PROBLEMS IN EXTRACTION OF PORTIONS OF AN IMAGE

BACKGROUND OF THE INVENTION

This invention relates to an image processing apparatus and method, and an image processing system and, more particularly, to an image processing apparatus and method, and an image processing system, which extract and synthesize objects in a color image.

In recent years, MPEG4 (Moving Picture Experts Group Phase 4) is being specified as new international standards of moving image coding schemes.

In a conventional moving image coding scheme represented by MPEG2, coding is done in units of frames or fields. However, in order to re-use or edit contents (person and building, voice, sound, background, and the like) which form the video and audio parts of a moving image or moving picture, MPEG4 is characterized by handling video and audio data as objects. Furthermore, objects contained in video data are independently encoded, and can be independently handled.

According to MPEG4, encoding/decoding is done in units of objects, thus allowing various applications in units of objects, such as improvement of coding efficiency, data distribution depending on transmission paths, re-processing of images, and the like, which cannot be attained by the conventional scheme.

In this manner, with the advent of MPEG4, processes for separating/synthesizing an image in units of objects by exploiting digital techniques has received a lot of attention.

Objects to be handled by MPEG4 includes shape data indicating a shape and α data indicating transparency of an object in addition to texture data indicating a pattern itself by luminance (Y) data and color difference (chroma) data. However, if an object does not have a semi-transparent state, α data is omitted. Hence, a description that pertains to α data will be omitted hereinafter.

In general, moving image data has a format called 4:2:0 obtained by subsampling chroma data to 1/2 with respect to Y data in both the horizontal and vertical directions in view of visual characteristics and data amount. FIG. 27 shows this format, i.e., an example of pixel matrices of Y and chroma data in chroma-subsampled moving image data. As can be seen from FIG. 27, one Cr/Cb chroma pixel is sampled per four Y pixels.

Also, an object having an arbitrary shape in MPEG4 is extracted as a region 1001 called a "bounding box" that circumscribes an object, as shown in FIG. 28. That is, an object in FIG. 28 is a human figure within the bounding box 1001. The bounding box 1001 has a size corresponding to an integer multiple of that of a macroblock 1002, and its absolute position is expressed by the distance from the upper left corner of a frame.

FIG. 29 shows the configuration of the macroblock 1002. That is, the macroblock 1002 is configured by four 8×8 Y data blocks, a pair of 8×8 Cb and Cr data blocks, and 16×16 shape data.

As a method of extracting/synthesizing objects from a moving image, a scheme called blue-back chroma keying is well known. In this scheme, a blue background is prepared in advance in a studio set in color TV broadcast, and is replaced by another background image by a switcher for an image obtained by sensing an arbitrary object in that background. Hence, when an object is to be extracted from that sensed image, the blue background portion can be processed as a dataless portion without being replaced by another background data.

Upon extracting objects from a still image, a method of extracting an object by detecting an edge portion, a method of extracting an object by setting a threshold value for a signal level, and the like are known.

However, the conventional object extraction/synthesis method suffers the following problems.

In an object extraction/synthesis process complying with MPEG4, Y data does not pose any problem since it has the same resolution as that of shape data. However, since the horizontal and vertical resolutions of chroma data are half those of the shape data, if an object boundary is defined by the resolution of shape data, chroma pixels may extend across the boundary of an object depending on the data shape in a boundary macroblock. In such case, chroma pixels that extend across the boundary include both colors inside and outside the object.

This brings about the following two problems.

First, in the extracted object, since chroma data that includes the outside color has a value different from the neighboring chroma data in the object, the coding efficiency of that object lowers.

Second, since the edge portion of the extracted object has a false color (color outside the object), when that object is synthesized with another image, and the synthesized image is displayed, it looks unnatural.

SUMMARY OF THE INVENTION

Accordingly, it is an object of the present invention to provide an image processing apparatus and method, and an image processing system, which can extract objects without any coding efficiency drop of an image.

According to the present invention, the foregoing object is attained by providing an image processing apparatus comprising: an image processing apparatus comprising: input means for inputting data which represents an image including an object image; shape generation means for generating shape data which represents a shape of the object image; first texture generation means for generating first texture data which represents luminance of the object image on the basis of a luminance signal in the data; second texture generation means for generating second texture data which represents color of the object image on the basis of color difference signals in the data; and output means for outputting the shape data, and the first and second texture data, wherein the second texture generation means generates second texture data corresponding to a boundary portion of the object image using a generation method different from a generation method for other portion.

With this apparatus, the coding efficiency of an object extracted from an image can be improved.

It is another object of the present invention to provide an image processing apparatus and method, and an image processing system, which can realize natural color reproduction of the extracted object.

According to the present invention, the foregoing object is attained by providing an image processing apparatus comprising: an image processing apparatus comprising: object input means for inputting image data which represents an object; shape generation means for generating shape data which represents a shape of the object from the image data; texture generation means for generating first texture data which represents luminance of the object and second texture data which represents color difference of the object from the image data; target image input means for inputting target image data with which the object is to be synthesized; and synthesis means for synthesizing the first and second texture data with the target image data on the basis of the shape data, wherein the synthesis means generates second texture data corresponding to a boundary portion of the object.

With this apparatus, upon synthesizing an object with a background image, natural color reproduction can be assured at their boundary.

The invention is particularly advantageous since objects can be extracted without any coding efficiency drop. Also, an object can be synthesized with a background image while assuring natural color reproduction.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a flow chart showing an object extraction process;

FIG. 18 shows an ideally extracted Y pixel matrix with respect to the object shown in FIGS. 17A and 17B;

DESCRIPTION OF THE PREFERRED EMBODIMENTS

Preferred embodiments of the present invention will now be described in detail in accordance with the accompanying drawings.

First Embodiment

This embodiment will exemplify a case wherein coding efficiency drop is avoided by excluding a boundary chroma value upon object extraction. •Boundary Discrimination in Normal Object Extraction Process A boundary discrimination process in the conventional object extraction process based on blue-back chroma-keying will be described in detail first.

In the object extraction process based on blue-back chroma-keying, whether the pixel of interest is located inside or outside an object is checked for both Y and chroma pixels on the basis of the threshold value of the chroma pixel. Therefore, a discrimination result for, especially, a pixel extending across the object boundary, i.e., whether that pixel is located inside or outside the object, varies depending on the set chroma threshold value. That is, the object extraction results of both Y and chroma data vary depending on the chroma threshold value.

Figure 17A:
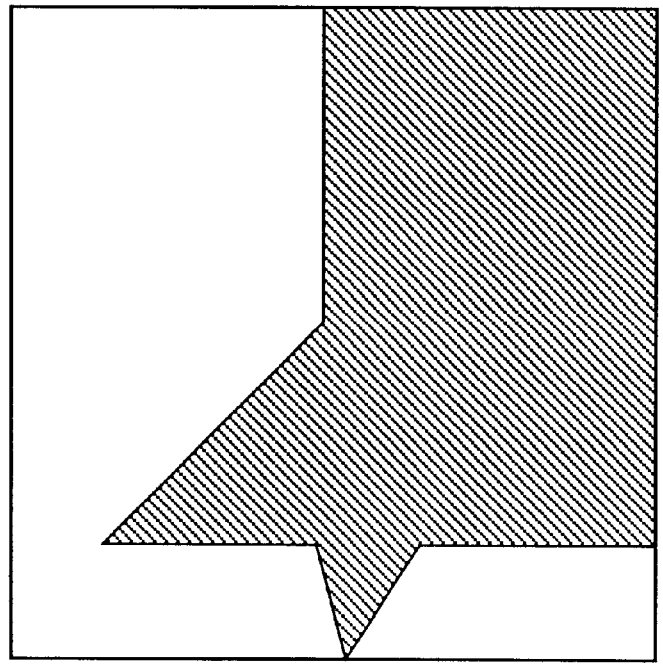
FIGS. 17A and 17B show object shapes.
Figure 17B:
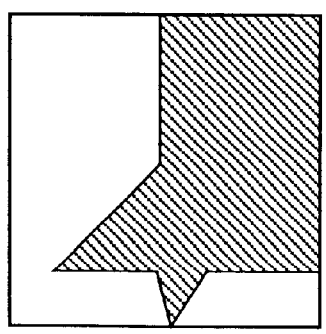

Variations of the object extraction result depending on the threshold value will be explained taking as an example a case wherein objects having shapes shown in FIGS. 17A and 17B are extracted. Note that FIGS. 17A and 17B respectively show Y and chroma object shapes.

When an object having the shape shown in FIG. 17A is extracted, its ideal extraction result in units of Y pixels has a pixel matrix shown in FIG. 18.

However, when the object is extracted while arbitrarily setting the chroma threshold value in blue-back chroma-keying, extracted chroma pixels change, as shown in FIGS. 19B, 20B, 21B, and 22B, in correspondence with the threshold values. Note that FIGS. 19A, 20A, 21A, and 22A show extracted Y pixels corresponding to the extracted chroma pixels.

Figure 19A:
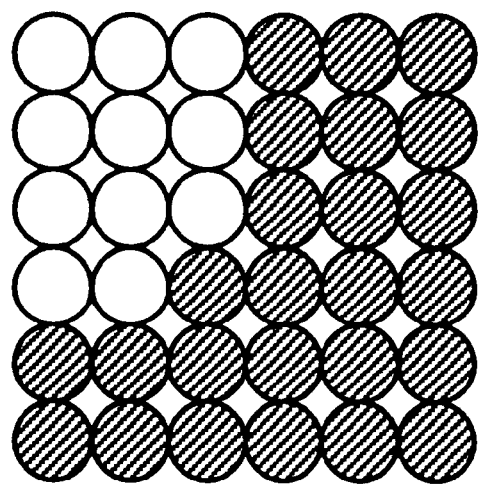
FIGS. 19A and 19B show examples of extracted objects when the chroma threshold value is low.
Figure 19B:
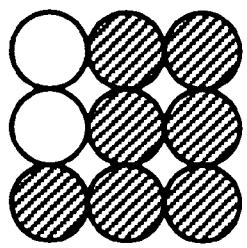

FIG. 19B shows an example of the extracted object when the chroma threshold value is low. That is, when a low threshold value is set, all pixels that extend across the boundary are extracted as those inside the object. In this case, since Y pixels are extracted from a range corresponding to extracted chroma pixels, an extraction result shown in FIG. 19A is obtained.

Figure 20A:
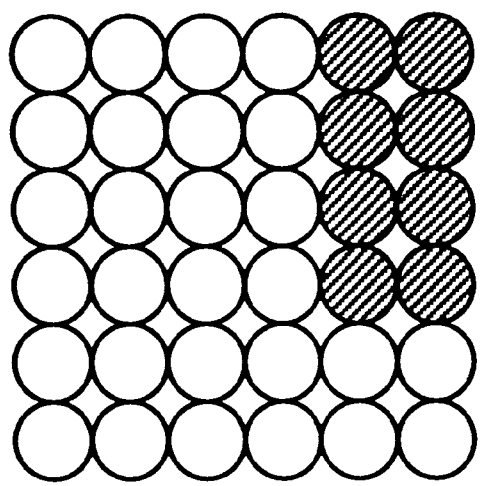
FIGS. 20A and 20B show examples of extracted objects when the chroma threshold value is high.
Figure 20B:
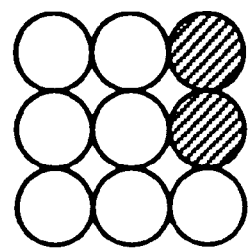
Figure 21A:
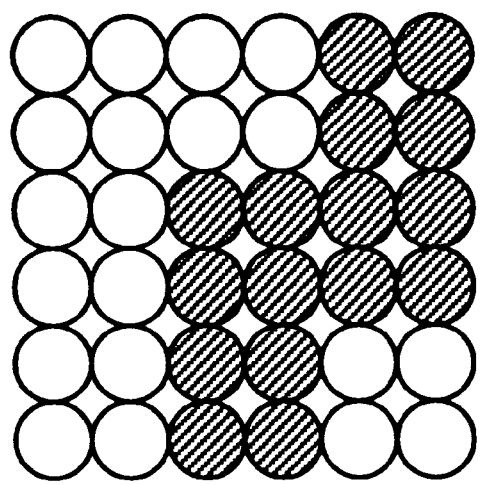
FIGS. 21A and 21B show examples of extracted objects when the chroma threshold value is relatively high.
Figure 21B:
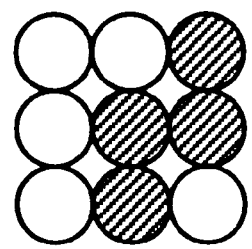
Figure 22A:
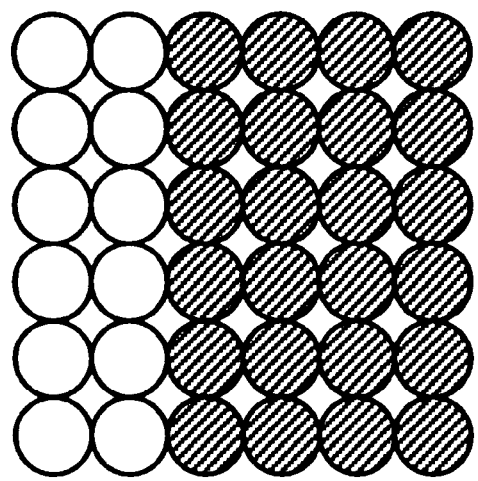
FIGS. 22A and 22B show examples of extracted objects when the chroma threshold value is relatively low.
Figure 22B:
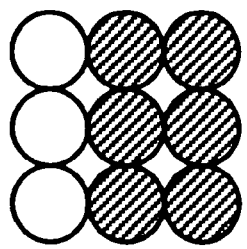

FIG. 20B shows an example of the extracted object when the chroma threshold value is high. That is, when a high threshold value is set, all pixels that extend across the boundary are extracted as those falling outside the object. In this case, since Y pixels are similarly extracted from a range corresponding to extracted chroma pixels, an extraction result shown in FIG. 20A is obtained.

By changing the chroma threshold value in this way, boundary pixels can be set to fall within or outside the object. However, when the threshold value is either low or high, the shape of the extraction result of Y pixels (FIG. 19A or 20A) becomes considerably different from the original shape shown in FIG. 17A.

FIGS. 21A and 21B and FIGS. 22A and 22B show examples of extracted Y and chroma objects when relatively high and low threshold values are set so that some of pixels which extend across the boundary fall within the object and some other pixels fall outside the object. The shapes of the extraction results of Y pixels shown in FIGS. 21A and 22A become rather closer to an ideal pixel matrix shown in FIG. 18 than FIGS. 19A and 20A, but are far from an ideal one. In this manner, when object extraction is done based on the chroma threshold value, since Y pixels are extracted depending on chroma pixel precision, it is difficult to extract Y pixels in an ideal shape. Hence, in order to extract Y pixels to have an ideal pixel matrix shown in FIG. 18, not only chroma threshold value setups but also threshold value setups based on Y pixel precision are required.

However, even when the Y extraction result shown in FIG. 18 is obtained by expanding chroma threshold value setups based on blue-back chroma-keying to Y or using another scheme, the shape of corresponding extracted chroma pixels is not similar to the Y shape. For this reason, chroma pixels on the boundary inevitably include colors of pixels outside the object.

This embodiment will exemplify a case wherein coding efficiency drop due to object extraction is avoided.

Arrangement of Object Coding Apparatus

Figure 1:
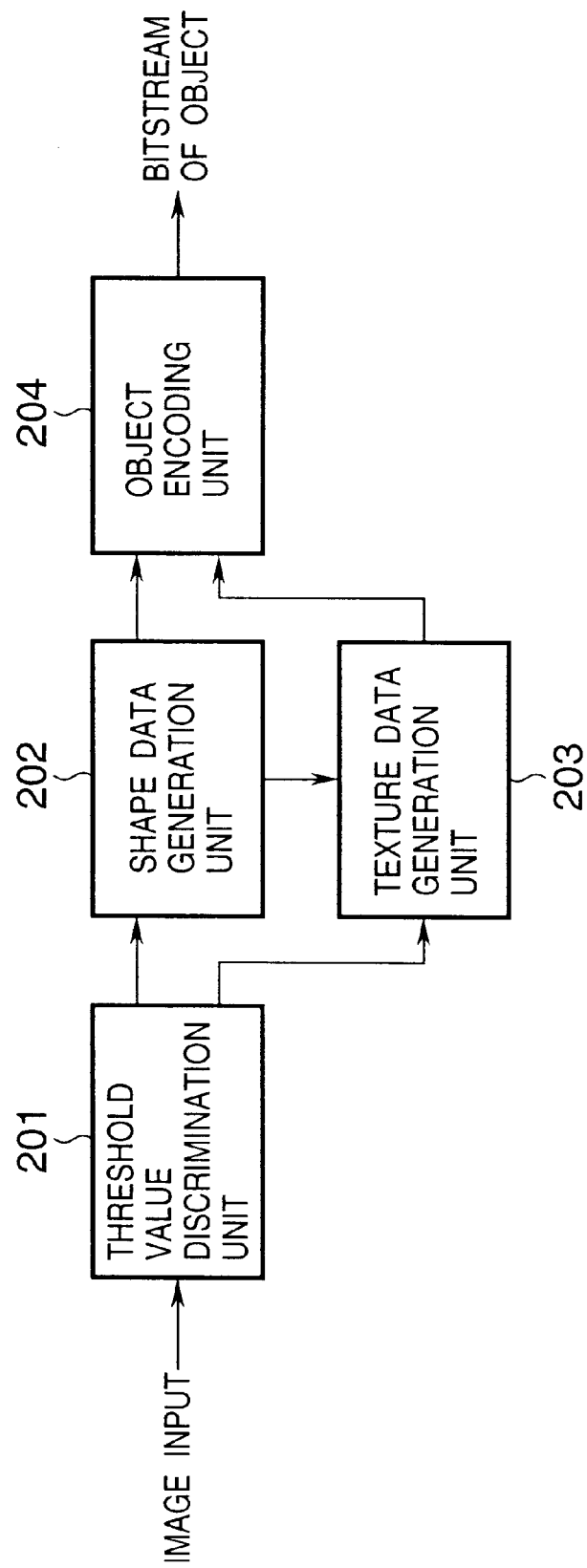
FIG. 1 is a block diagram showing the arrangement of an image processing apparatus according to the first embodiment of the present invention.

FIG. 1 is a block diagram showing the overall arrangement of an image processing apparatus that implements object coding according to this embodiment.

This apparatus receives chroma-subsampled image data. A threshold value discrimination unit 201 makes threshold value discrimination for the image data in units of Y and chroma data, and a shape data generation unit 202 and texture data generation unit 203 respectively generate shape and texture data on the basis of the discrimination results.

Shape data is binary data that represents the shape of an object. For example, assume that a pixel which is located outside an object is a "0", and a pixel which is located inside the object is a "1". On the other hand, texture data is data that represents a pattern, and is composed of luminance (Y) and chroma (Cr, Cb) components. The size of the shape data which corresponds to the size of the input image is equal to that of luminance (Y) data in the input image data. An object of this embodiment is formed by a combination of these shape and texture data.

In this manner, an object is extracted by the threshold value discrimination unit 201, shape data generation unit 202, and texture data generation unit 203. Note that detailed algorithms of threshold value discrimination and shape/texture data generation that pertain to object extraction will be described later.

The object formed by the generated shape and texture data is encoded by an object encoding unit 204, thus achieving data compression of an object corresponding image. When the object encoding unit 204 encodes by exploiting interframe correlation, motion vector data is encoded in addition to the shape and texture data. When these encoded data are multiplexed, the multiplexed data is output as a bitstream of the object.

Object Extraction Process

The object extraction process in this embodiment will be explained below. Note that the object extraction process in this embodiment corresponds to a process for generating shape and texture data of an object.

Figure 27:
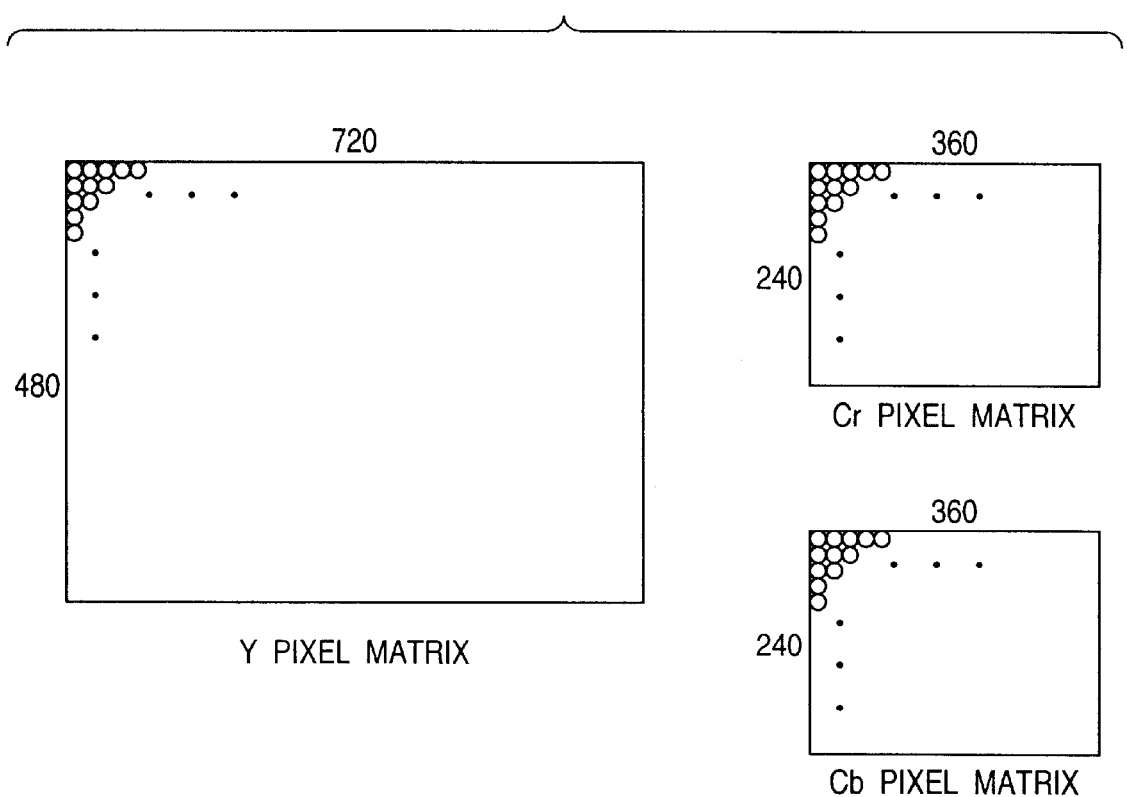
FIG. 27 shows chroma-subsampled pixel matrices.
Figure 29:
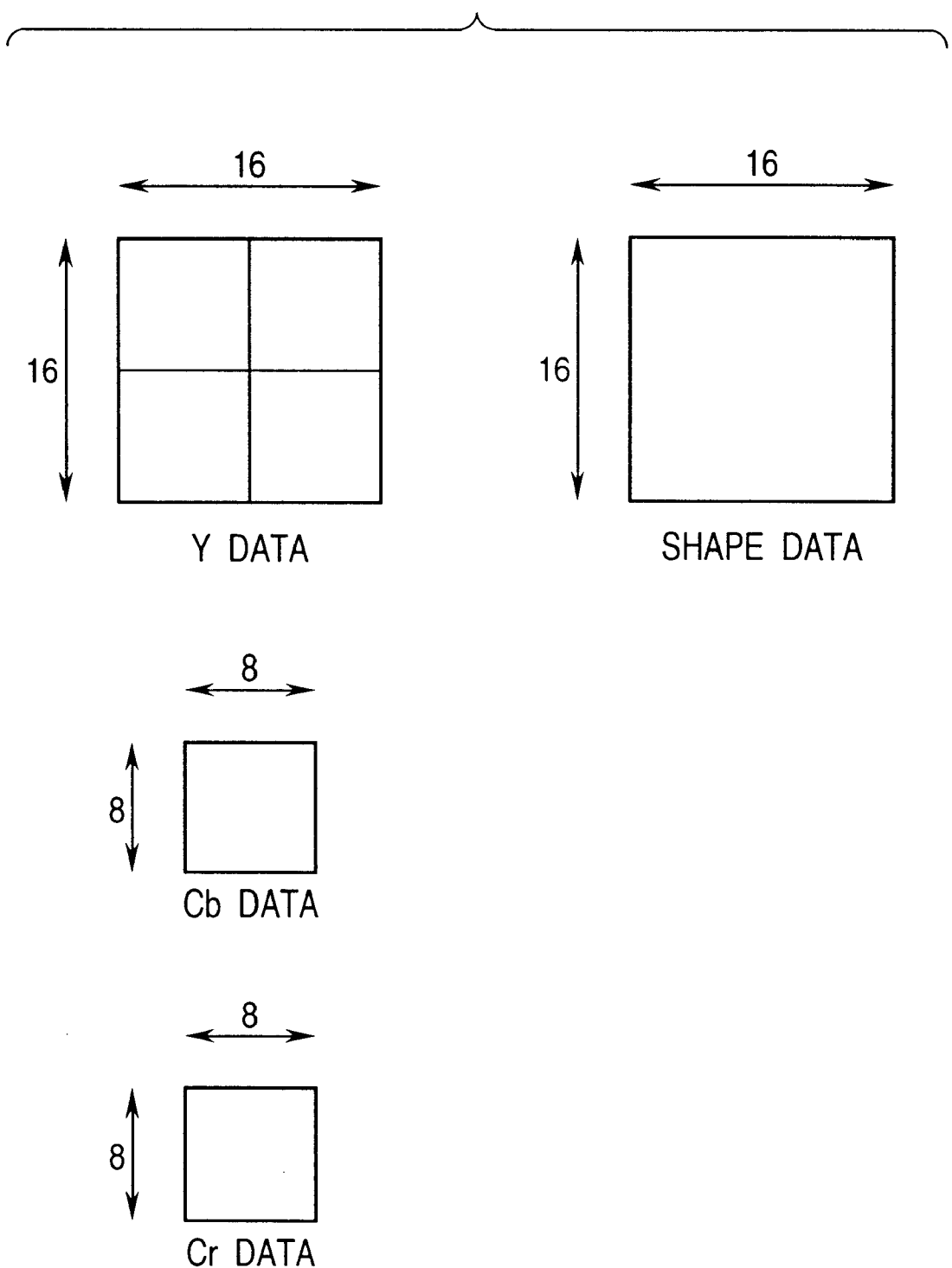
FIG. 29 is a view for explaining the configuration of a macroblock.

FIG. 2 is a flow chart showing the object extraction process in this embodiment. The following explanation will be given assuming that the sampling pattern of pixels of an input image has a matrix shown in FIG. 27, and the object shape to be extracted is as shown in FIG. 17. Note that one macroblock of an object is comprised of four pixels of shape data, and four Y pixels and a pair of Cr and Cb pixels as texture data in the object extraction process of this embodiment, as shown in FIG. 29.

In step S101, a block consisting of four Y pixels (Y0 to Y3) and a pair of Cr and Cb pixels is generated. Then, pixels in the block of interest undergo threshold value discrimination. The shape and texture data that form an object of this embodiment are generated upon executing the threshold value discrimination process.

If it is determined in step S102 that Cr and Cb do not fall within a predetermined threshold value range, it is determined before discrimination pertaining to Y pixels that pixels in the block of interest are located outside the object, and the flow advances to step S103. On the other hand, if Cr and Cb fall within the threshold value range, the flow advances to step S104 to discriminate Y pixels.

It is checked in step S104 if any of Y0 to Y3 falls within a predetermined threshold value range. If none of those pixels fall within the range, it is determined that the pixels in the block of interest are located outside the object, and the flow advances to step S103.

In step S103, all four shape data corresponding to the block of interest are set at "0". In this case, since the block of interest falls outside the object, no texture data value is set.

On the other hand, if it is determined in step S104 that at least one of Y0 to Y3 falls within the predetermined threshold value range, the flow advances to step S105 to generate shape data, so that a pixel or pixels that falls or fall within the threshold value range is or are located inside the object, and pixels or a pixel that fall or falls outside the threshold value range are or is located outside the object.

In step S106, a Y value or values of the pixel or pixels which is or are located inside the threshold value range is or are set as Y texture data.

Subsequently, chroma texture data is set. It is checked in step S107 if all the four Y pixels (Y0 to Y3) fall within the object. If all the four Y pixels are located inside the object, Cr and Cb values are set as chroma texture data in step S108. However, if at least one of the four pixels is located outside the object, it is determined that the block of interest forms an object boundary. In this embodiment, pixels which are located on the boundary are determined to be those located outside the object, and no chroma values are set for these pixels. In other word, chroma values of the object boundary are set as invalid data.

Figure 3A:
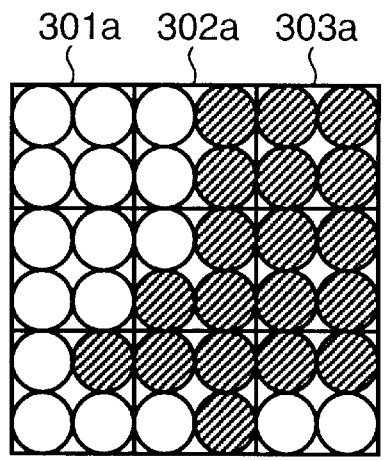
FIGS. 3A to 3C show examples of extracted object data.
Figure 3B:
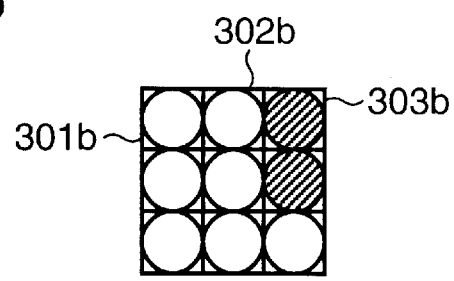
Figure 3C:
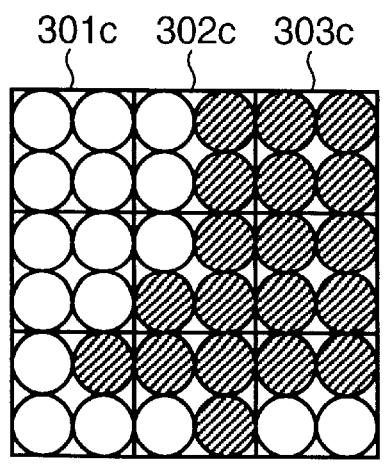

FIGS. 3A and 3B show examples of Y and chroma texture data which are set in this way, and FIG. 3C shows an example of shape data. In FIGS. 3A to 3C, blocks 301a to 301c correspond to each other, and so do blocks 302a to 302c and 303a to 303c.

Black pixels in FIG. 3C are those which are determined to fall within the object, and black pixels in FIGS. 3A and 3B are those set with significant texture data. In other words, white pixels in FIG. 3C are those falling outside the object, and white pixels in FIGS. 3A and 3B are set with arbitrary values. As can be seen from FIG. 3A, Y texture data shown in FIG. 3A matches an ideal Y object extraction result shown in FIG. 18.

As shown in FIGS. 3A to 3C, Y texture data and shape data have the same shape (301a and 301c), and in chroma texture data, Cr and Cb values are set for only chroma pixels (corresponding to 303b) in correspondence with a block including all four pixels falling within the object in Y blocks, in other words, a block (303a) set with significant data. That is, if at least one of four Y pixels in a block falls outside the object, no chroma texture data is set (corresponding to 301b and 302b).

The aforementioned steps S101 to S108 are repeated, and upon completion of discrimination for all pixels on one frame in step S109, shape and texture data for the entire image are generated, i.e., the object extraction process of this embodiment ends.

Padding Process

With the aforementioned object extraction process, shape data of the object is completely prepared. However, as for texture data, those inside the object are set but those outside the object have arbitrary values.

Hence, the object encoding unit 204 encodes the object after it sets texture data outside the object to improve coding efficiency. A method of setting texture data outside the object in this embodiment will be explained below.

The object encoding unit 204 replaces values of pixels of texture data outside the object by those of neighboring pixels inside the object prior to encoding the object. This replacement process is called padding, which is done in units of macroblocks indicated by 1002 in FIG. 28.

Padding will be explained in detail below. Pixel values inside the object are padded in texture data outside the object in the horizontal direction (horizontal padding), and pixel values inside the object are repetitively padded in texture data, which were not stuffed by horizontal padding, in the vertical direction (vertical padding).

Figure 4A:
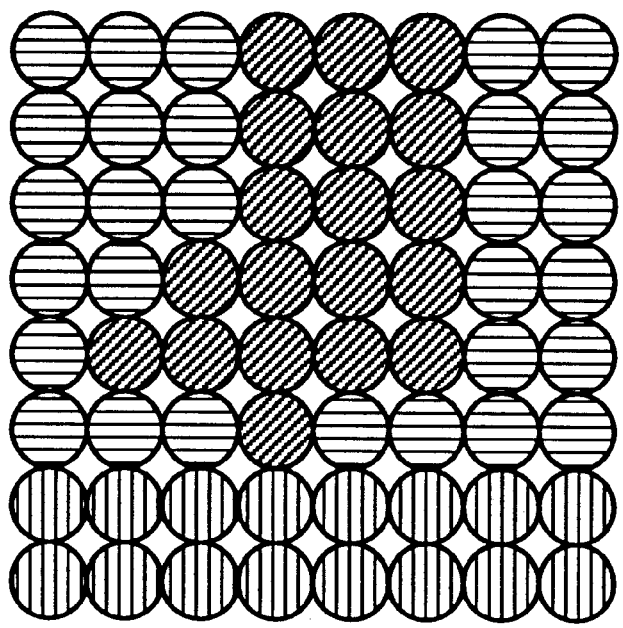
FIGS. 4A and 4B show examples of padding of texture data.
Figure 4B:
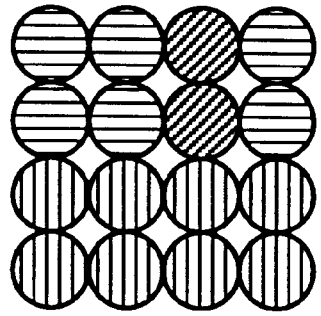

FIGS. 4A and 4B show examples of padding of Y and chroma macroblocks. Assume that a Y macroblock has an 8×8 pixel size, and a chroma macroblock has a 4×4 pixel size. In FIGS. 4A and 4B, black pixels are those inside the object, horizontally striped pixels are those set by horizontal padding, and vertically striped pixels are those set by vertical padding.

With the above process, shape and texture data are completely prepared, and the object is completely extracted. Then, the object encoding unit 204 encodes these texture and shape data and multiplexes them, thus outputting the multiplexed data as a bitstream of the extracted object.

As described above, according to object coding of this embodiment, chroma data which extend across the boundary of an object are not included in the object, and chroma data on the object boundary are set with the same values as neighboring chroma data inside the object, thus improving coding efficiency.

Second Embodiment

The second embodiment of the present invention will be described below.

The second embodiment will exemplify a case wherein the object encoded by the first embodiment is decoded and is synthesized with a background image.

Arrangement of Object Synthesis Apparatus

Figure 5:
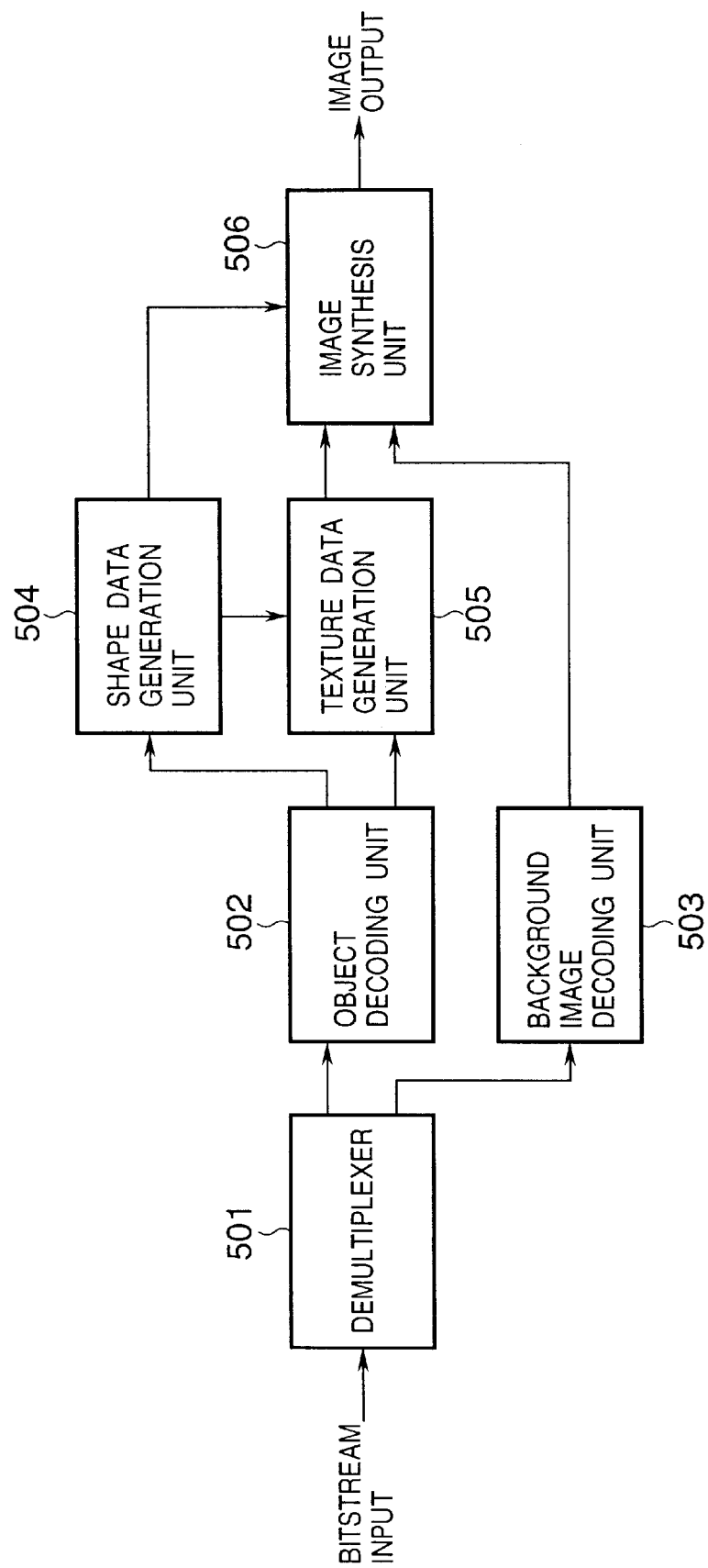
FIG. 5 is a block diagram showing the arrangement an image processing apparatus according to the second embodiment of the present invention.

FIG. 5 is a block diagram showing the overall arrangement of an image processing apparatus that implements object synthesis according to the second embodiment. This apparatus receives a bitstream which is obtained by multiplexing the encoded data of an object output from the image processing apparatus of the first embodiment, and encoded data of an arbitrary background image. The bitstream is input to a demultiplexer 501 to demultiplex the multiplexed data, the encoded object data is input to an object decoding unit 502, and the encoded background data is input to a background image decoding unit 503.

The object decoding unit 502 further demultiplexes the object data into shape and texture data, which are respectively decoded by a shape data generation unit 504 and texture data generation unit 505. When object data has undergone coding that exploits correlation in the time domain, a motion vector coding process is additionally done. An image synthesis unit 506 synthesizes the texture data of the object and the background image on the basis of the generated shape data, thus outputting a synthesized image.

Object Synthesis Process

Figure 6:
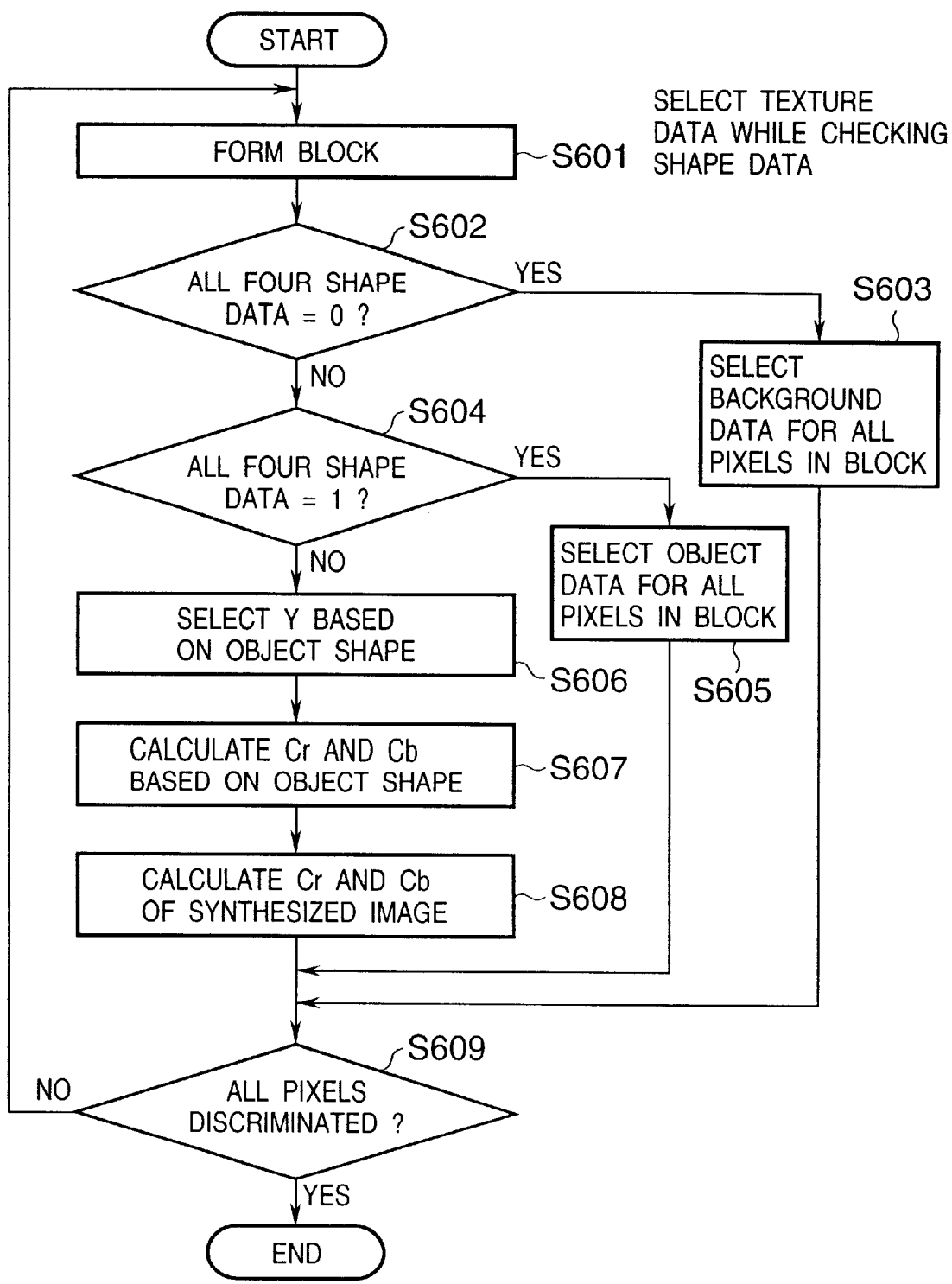
FIG. 6 is a flow chart showing an object synthesis process.

The object synthesis process in the image synthesis unit 506 will be explained in detail below with reference to FIG. 6.

In step S601, blocks are generated in correspondence with the subsampled shape. As in the first embodiment, one texture data block is comprised of four Y pixels and a pair of Cr and Cb pixels.

It is checked in step S602 if shape data (four pixels) corresponding to the block of interest falls within the object. That is, if all four shape data corresponding to the block of interest are "0"s, it is determined that they fall outside the object, and background image data values are selected as Y, Cr, and Cb values for all the pixels in the block of interest in step S603.

On the other hand, if it is determined in step S604 that all four shape data are "1"s, it is determined that they fall within the object, and texture data of the object are selected as Y, Cr, and Cb values for all the pixels in the block of interest in step S605.

If it is determined in step S604 that at least one shape data falls within the object, different processes are done for Y and chroma data. As for Y data, according to the object shape, the texture data are selected and set for pixels inside the object and the background image data are selected and set for pixels outside the object in step S606.

As for chroma data, an arithmetic operation is made based on the object shape and surrounding pixel values to calculate chroma values in step S607. In step S608, chroma values in the synthesized image are synthesized based on the chroma values calculated in step S607 and background values. The chroma arithmetic operation and chroma synthesis process will be described in detail later.

The aforementioned steps S601 to S608 are repeated, and upon completion of discrimination for all pixels in step S609, the object synthesis process for the object of interest ends.

Chroma Data Setups at Object Boundary

The chroma setup process in steps S607 and S608 executed when at least one shape data falls within the object will be described in detail below with reference to FIGS. 7 to 9C.

Figure 7:
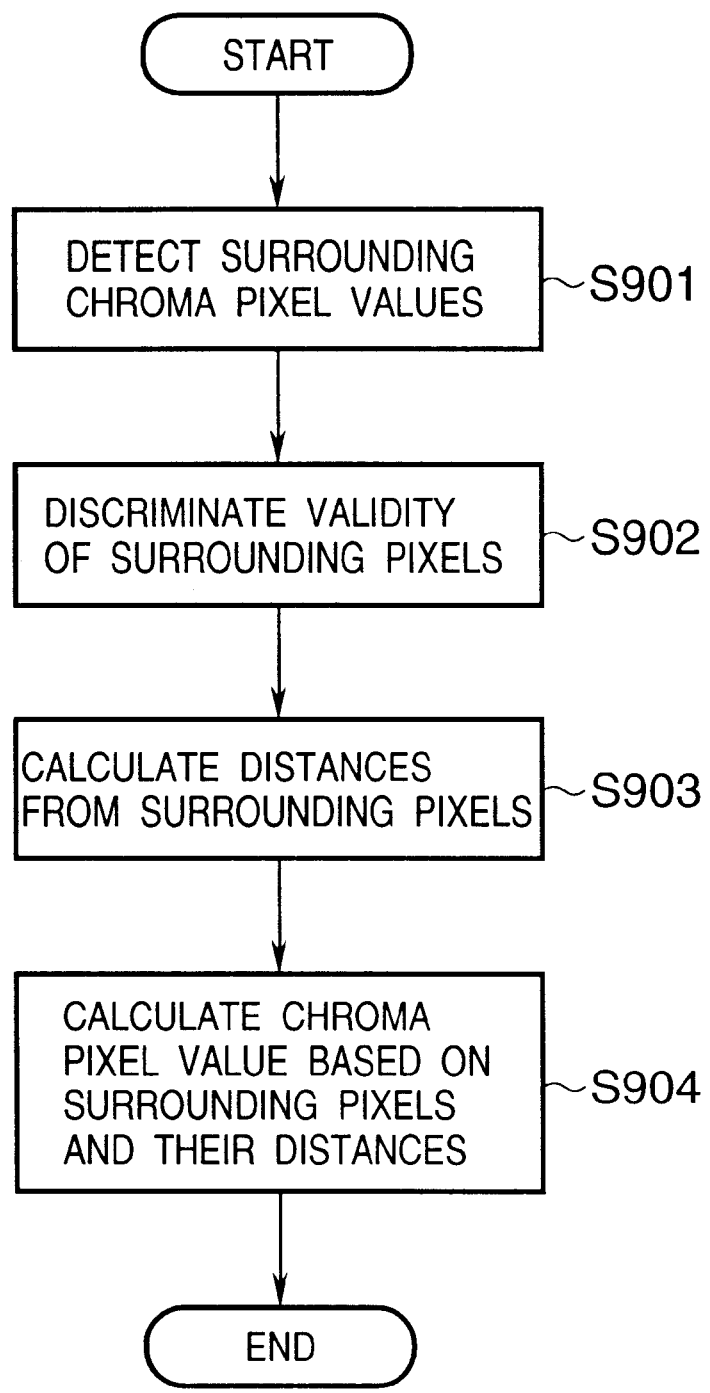
FIG. 7 is a flow chart showing a chroma data generation process.

FIG. 7 is a flow chart showing a chroma texture data calculation process in step S607. In the second embodiment, the chroma value of the pixel of interest is calculated on the basis of those of valid pixels around the pixel of interest.

Figure 8:
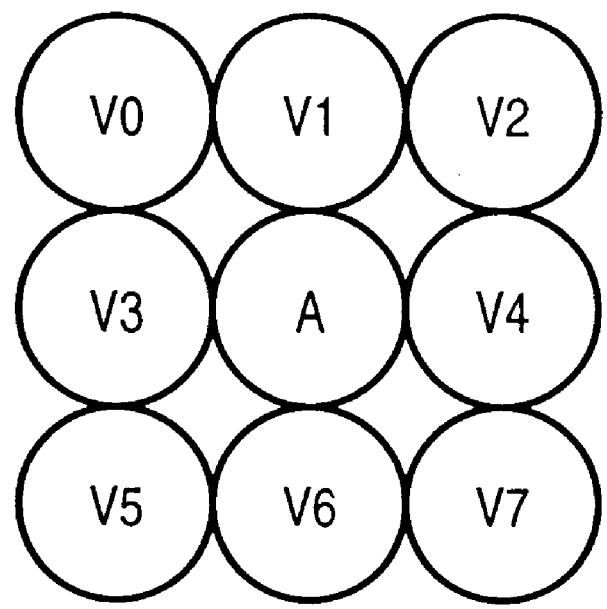
FIG. 8 shows the pixel positional relationship in a chroma data validity discrimination process.

In step S901, the chroma values of surrounding pixels are detected. FIG. 8 shows the positional relationship between target pixel A as the current pixel to be processed, and its surrounding pixels V0 to V7. An example for calculating the chroma value of target pixel A will be explained below.

As combinations of surrounding chroma pixels V0 to V7, there are $2^8=256$ patterns, which include invalid patterns that do not contribute to chroma value calculations of target pixel A. Hence, in the second embodiment, the validity of surrounding chroma pixels is discriminated in step S902. A method of detecting valid combinations (chroma patterns) of surrounding chroma pixels will be explained below.

Target chroma pixel A has corresponding shape data consisting of four pixels. In the second embodiment, it is determined that a combination of surrounding chroma pixels, which do not neighbor valid pixels in shape data, i.e., the shape pattern, of the target pixel, is invalid. In the other words, it is determined that a combination of surrounding pixels, which neighbor the shape pattern of target pixel A, is valid.

Figure 9A:
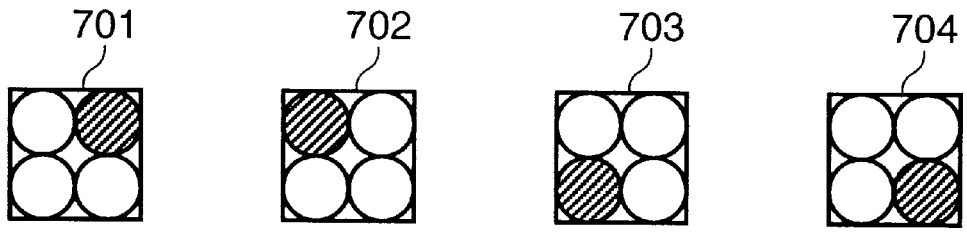
FIGS. 9A to 9C show examples of shape patterns in the chroma data validity discrimination process.
Figure 9B:
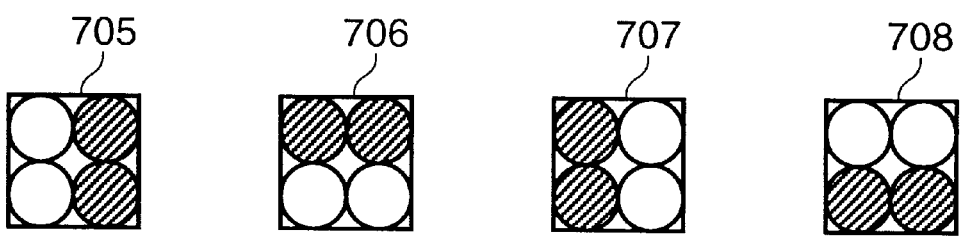
Figure 9C:
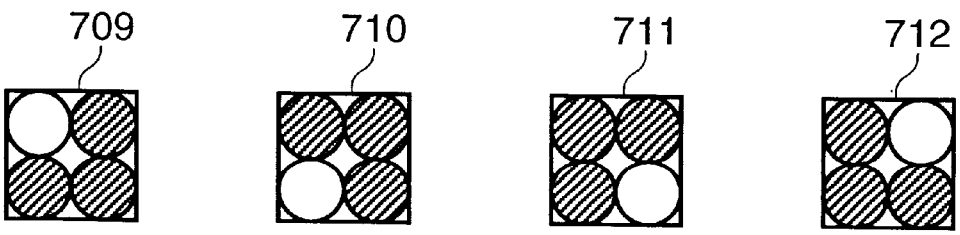

The validity discrimination process will be described below with reference to FIGS. 9A to 9C. FIGS. 9A, 9B, and 9C respectively show patterns (shape patterns) that shape data (corresponding to black pixels in FIGS. 9A to 9C) in a block can form upon synthesis with background color (corresponding to white pixels in FIGS. 9A to 9C)=75%, 50%, and 25%. For example, when target chroma pixel A corresponds to shape pattern 701 shown in FIG. 9A, since surrounding chroma pixels V1, V2, and V4 neighbor the shape data, a pattern as a combination of these pixels is valid. Other combinations of surrounding pixels are invalid since the pixels do not neighbor the shape pattern of the target pixel.

Therefore, in case of the shape pattern 701, $2^3=8$ patterns are available as valid combinations of surrounding chroma pixels since they are combinations of surrounding pixels V1, V2, and V4. Hence, when background color=75% shown in FIG. 9A, a total of 8 patterns×4 types (701 to 704) are valid.

Likewise, when background color=50% shown in FIG. 9B, since the number of surrounding chroma pixels that neighbor the shape pattern of target pixel A is five, $2^5$ patterns×four types (705 to 708) are valid. On the other hand, when background color=25% shown in FIG. 9C, since the number of surrounding chroma pixels that neighbor the shape pattern of target pixel A is seven, $2^7$ patterns×four types are valid. Since four shape patterns in FIGS. 9A to 9C only have different directions, a total of 8+32+128=168 patterns are detected as valid patterns in consideration of their symmetry patterns.

In step S903 in FIG. 7, the distances between target pixel A and valid surrounding pixels are calculated. The central position of target pixel A corresponds to the barycenter of the shape pattern. Hence, the central position of target pixel A varies depending on the corresponding shape pattern.

In step S904, the chroma value of target pixel A is calculated on the basis of the obtained interpixel distances and chroma values of the surrounding pixels. If D0 to D7 represent the distances from the central position of target pixel A to surrounding pixels V0 to V7, chroma value Ac of target pixel A is given by:

$$Ac=\Sigma(Vn/Dn)\times\Sigma Dn \quad (1)$$

where n indicates only valid surrounding pixels determined in step S902. In this manner, the chroma value of target pixel A can be calculated as the average of chroma values of surrounding pixels, which are weighted on the basis of their distances.

As described above, since the distances between target pixel A and the surrounding pixels depend on the shape pattern, they need not be calculated every time. For example, the interpixel distances may be held as a table to achieve high-speed processing. Since the distances are used to weight pixel values, if high precision is not required, high-speed arithmetic processing may be attained by rounding distance values to integers.

Also, as a simpler method, the value of one of the valid surrounding pixels, which is closest to the target pixel, may be determined to be the chroma value of the target pixel.

Chroma Synthesis Process

Figure 10:
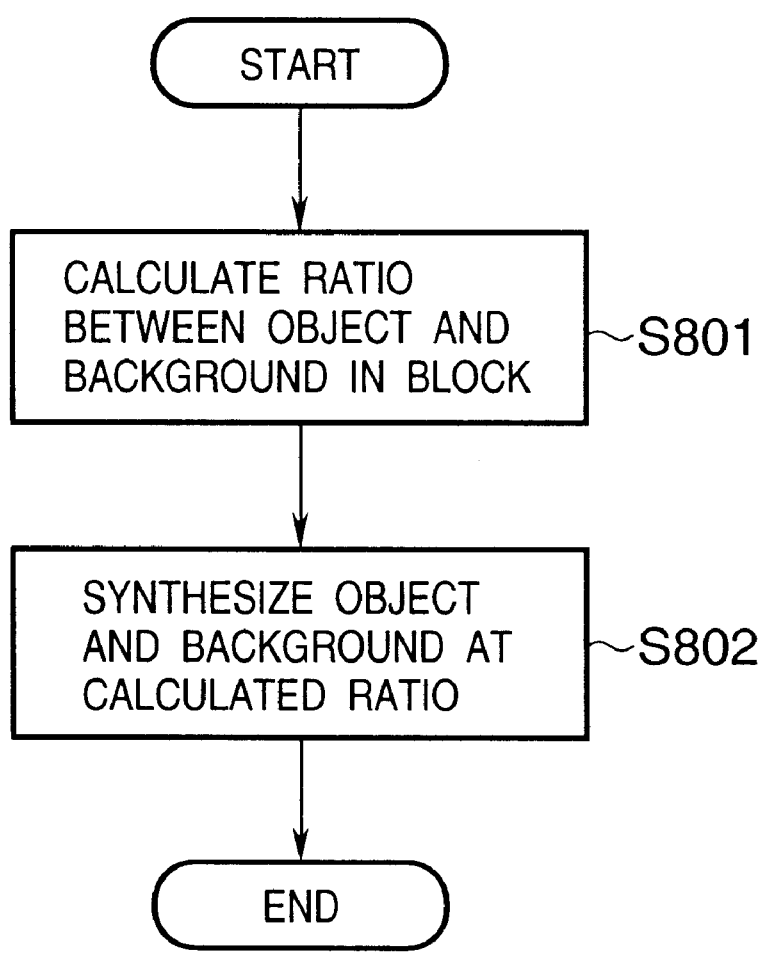
FIG. 10 is a flow chart showing a chroma data synthesis process.

The chroma synthesis process in step S608 in FIG. 6 will be described in detail below with reference to the flow chart shown in FIG. 10.

In step S608, the chroma value of target pixel A calculated based on equation (1) and that of a background pixel are synthesized on the basis of the ratio of intra-object pixels in a block.

In step S801, the ratio of background and object pixels of shape data in a given block is calculated. In step S802, background and object data undergo chroma synthesis on the basis of the calculated ratio.

For example, when the shape pattern of the block of interest has a background color=75%, as shown in FIG. 9A, the background ratio in a synthesized image is 3/4. Likewise, when background color=50% shown in FIG. 9B, the ratio=2/4; when background color=25% shown in FIG. 9C, the ratio=1/4.

Let A be the chroma data value of the object, and B be the chroma data value of the background. Then, chroma data value C of a synthesized image to be obtained is:

$$C=((\text{number of shape data in object})\times A+(\text{number of shape data outside object})\times B)/(\text{total number of shape data}) \quad (2)$$

In equation (2), "(number of shape data outside object)/(total number of shape data)" corresponds to the background ratio. Also, "total number of shape data" in equation (2) is the number of shape data corresponding to one chroma pixel, and is "4" in the second embodiment.

As described above, according to the second embodiment, upon synthesizing the object and background image, the value of chroma data which extends across the object boundary is calculated based on the chroma values of surrounding pixels, and the object and background image are synthesized on the basis of the ratio between the background and object in a given block, thus allowing natural color reproduction at the boundary between the background image and object image.

The second embodiment has exemplified a case wherein a total of two images, i.e., one background image and one object, are synthesized. Even when there are a plurality of objects which overlap each other or contact each other at an identical position, the background ratio is calculated based on their shape data, thus achieving appropriate image synthesis.

In the second embodiment, an object encoded by the first embodiment described above is decoded, and is synthesized with a background image. The apparatuses described in the first and second embodiments may be combined to obtain a single image processing apparatus. In this case, data need not be encoded or decoded. More specifically, image data including an object and background image data are parallelly input to the apparatus, the object is extracted from the image data by the method described in the first embodiment, and that object is synthesized with the background image data by the method described in the second embodiment, thus outputting a synthesized image.

In the above embodiments, a color image is expressed at a ratio Y:Cr:Cb=4:1:1. However, the present invention is not limited to such specific ratio, but may be applied to Y:Cr:Cb=4:1:0.

Third Embodiment

The third embodiment of the present invention will be described below.

The third embodiment will exemplify a case wherein coding efficiency drop is avoided by appropriately setting chroma values at object boundaries upon object extraction.
General Padding Process A general padding process, which is done in the object extraction process complying with MPEG4, will be described in detail below.

Figure 28:
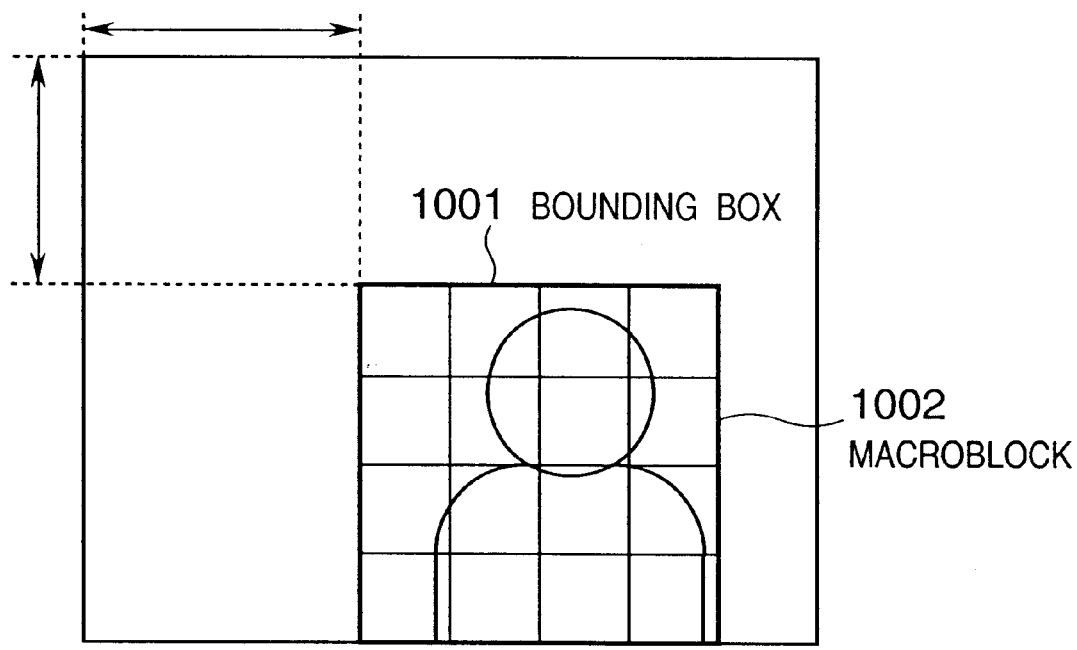
FIG. 28 is a view for explaining a bounding box.

An object is extracted in the form of a bounding box 1001, as shown in FIG. 28. As described above, within the bounding box 1001, "padding" for replacing texture data outside the object by those inside the object is executed to improve the coding efficiency. This process is done in units of macroblocks, and one of the following three methods is used depending on the state of the object:

(1) boundary macroblock padding when shape data extends across the boundary of an object;

(2) macroblock padding when shape data is located outside the object and neighbors a boundary macroblock; and (3) macroblock padding for a case other than the above two cases.

Padding processes in these cases will be explained below.

Boundary macroblock padding (1) will be explained below with reference to FIGS. 23 and 24.

Figure 23:
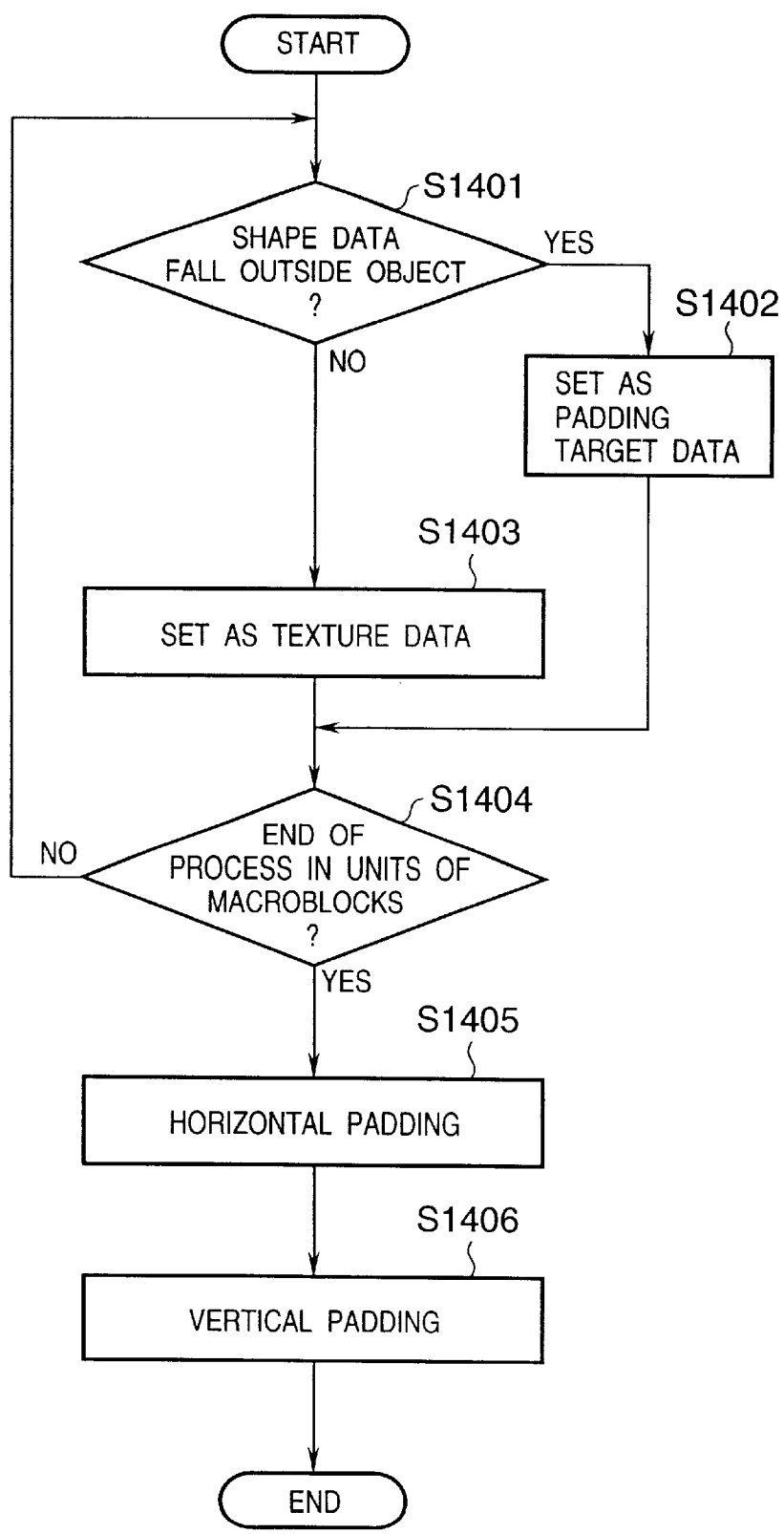
FIG. 23 is a flow chart showing a Y data extraction/padding process.

FIG. 23 is a flow chart showing boundary macroblock padding for Y data. Since the resolution of shape data matches that of Y data, discrimination can be made in units of pixels.

It is checked in step S1401 if shape data of interest is located outside the object. If YES in step S1401, the shape data of interest is determined to be padding target data in step S1402. On the other hand, if it is determined in step S1401 that the shape data of interest is located inside the object, texture data (image data of the object) is determined as output data in step S1403. Upon completion of discrimination for all pixels in a given macroblock (S1404), padding is done for the padding target data. In step S1405, horizontal padding is executed. In this process, data outside the object are padded by data inside the object in the horizontal direction. Then, pixels which were not stuffed by horizontal padding are stuffed by vertical padding in step S1406.

Figure 25:
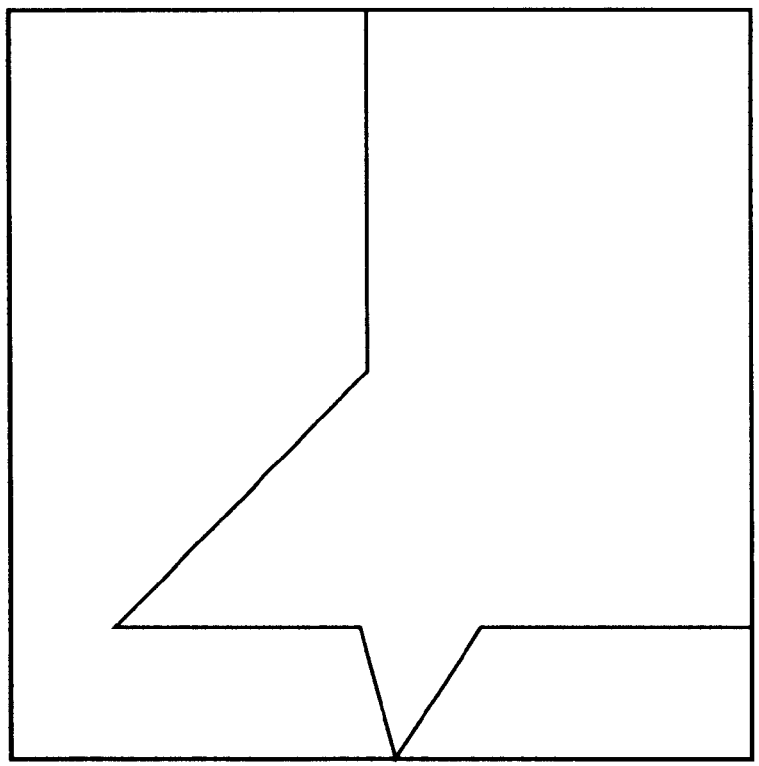
FIG. 25 is a view for explaining a boundary macroblock.
Figure 26A:
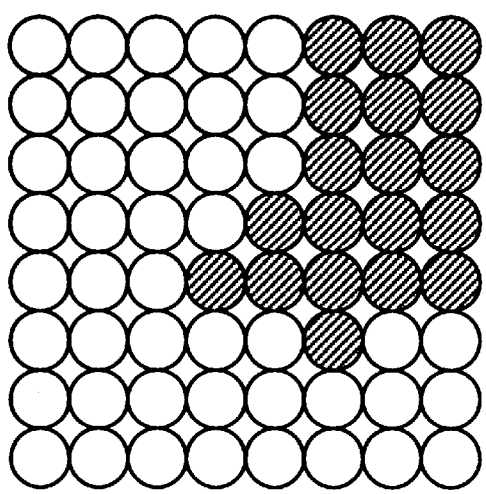
FIGS. 26A to 26D are views for explaining a boundary macroblock.
Figure 26B:
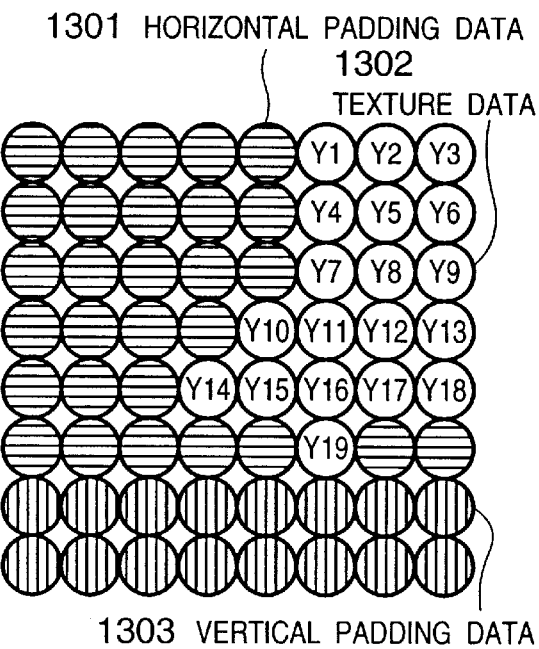

FIG. 25 shows an example of an ideal shape indicated by a boundary macroblock, and FIGS. 26A and 26B show padding examples of the boundary macroblock. Assume tentatively that the macroblock size in this case is 8×8 pixels for the sake of simplicity. FIG. 26A shows an example of shape data in the boundary macroblock. In FIG. 26A, full circles indicate pixels inside the object, and open circles indicate those outside the object. FIG. 26B shows Y data after padding at this time. In FIG. 26B, pixels Y1 to Y19 are texture data 1302, horizontally striped pixels are horizontal padding data 1301, and vertically striped pixels are vertical padding data 1303.

Figure 24:
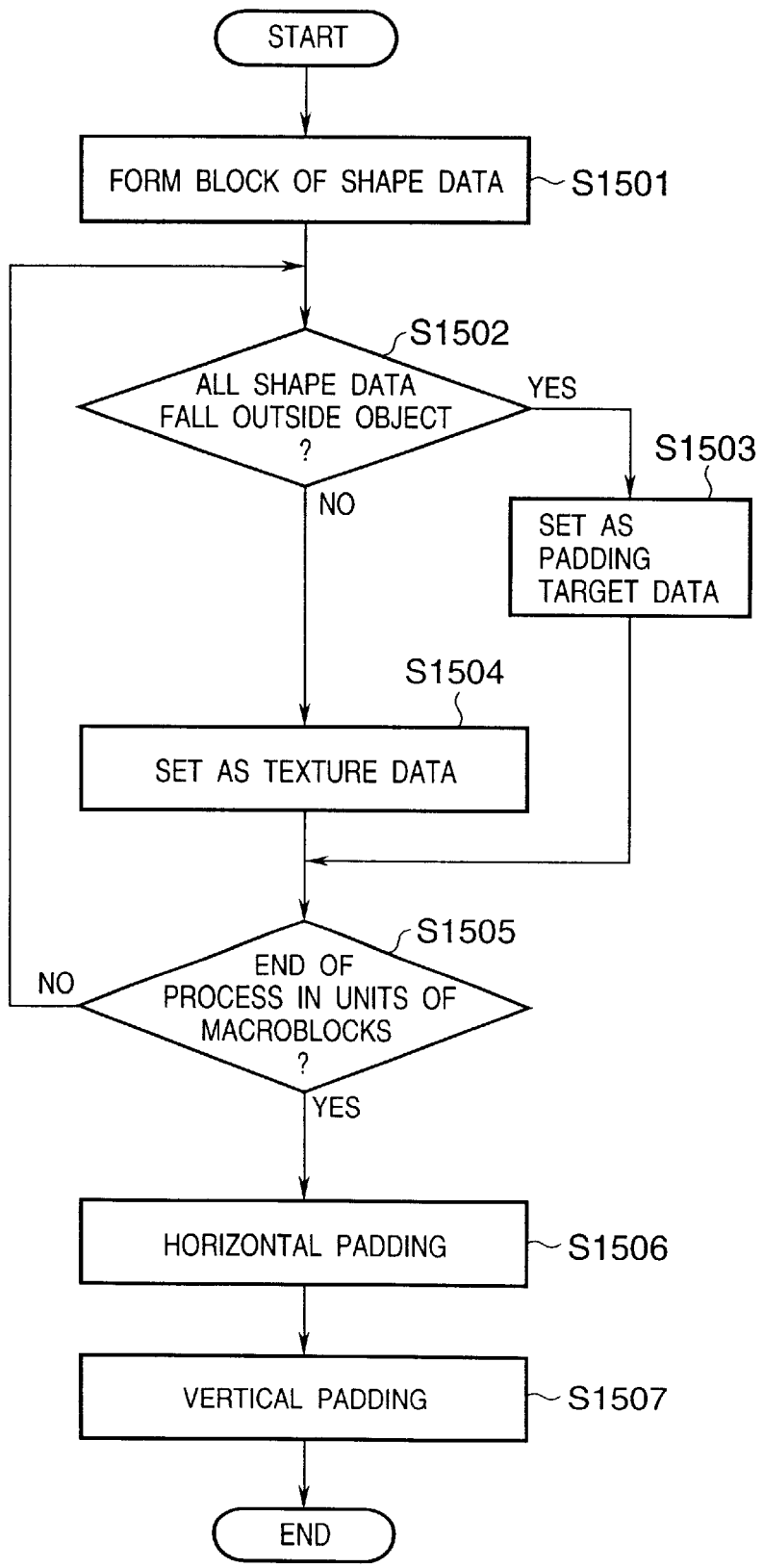
FIG. 24 is a flow chart showing a chroma data extraction/padding process.

FIG. 24 is a flow chart showing the boundary macroblock padding process for chroma data. There are two kinds of chroma data, i.e., Cb and Cr data, but since the same process is done for these data, the following description will be given without distinguishing them. Since both the horizontal and vertical resolutions of chroma data are half those of shape data, one chroma pixel is discriminated per four pixels of shape data.

In step S1501, a block of four pixels of shape data is formed. It is then checked in step S1502 if all four shape data in the block of interest are located outside the object. If YES in step S1502, that block is determined to be padding target data in step S1503.

On the other hand, if it is determined in step S1502 that at least one shape data is located inside the object, texture data is determined to be output data in step S1504. Upon completion of discrimination for all pixels in a given macroblock (S1505), padding is done for padding target data. Horizontal padding is executed first in step S1506, and pixels which were not stuffed by horizontal padding are then stuffed by vertical padding in step S1507.

Figure 26C:
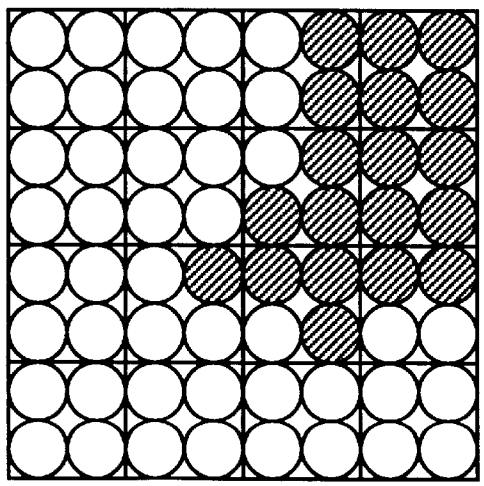
Figure 26D:
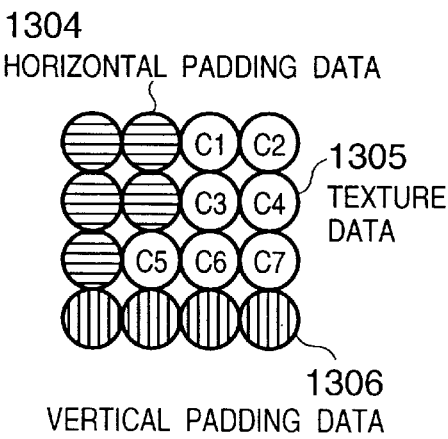

FIG. 26C shows an example of blocks of shape data formed in the boundary macroblock. FIG. 26D shows chroma data after padding at that time. In FIG. 26D, pixels C1 to C7 are texture data 1305, horizontally striped pixels are horizontal padding data 1304, and vertically striped pixels are vertical padding data 1306.

Macroblock padding (2) when shape data is located outside the object and neighbors a boundary macroblock will be explained below.

This padding process is called expanded padding. In a reference macroblock, the neighboring direction of a boundary macroblock is checked in the priority order of left, upper, right, and lower. If a neighboring boundary macroblock is found, data at the boundary position are repetitively copied in the horizontal or vertical direction.

Macroblock padding process (3) other than processes (1) and (2) will be explained below. That is, this process is done when shape data is located outside the object and does not neighbor any boundary macroblock, and is called constant value padding. In this process, all data in a given macroblock are set at a constant value "128".

In this manner, upon executing padding in advance on the encoder side, since the object boundary can be smoothened, the coding efficiency can be improved compared to a case wherein the object boundary has an edge. Since the decoder side executes a process reverse to that on the encoder, the padded data are replaced by background data.

When the object extracted with the above-mentioned padding data is synthesized with another image (background data), a sequence reverse to the object extraction process can be basically done.

However, in the general padding process, chroma pixels that extend across the object boundary are generated due to different resolutions of shape data and chroma data, resulting in low coding efficiency and poor color reproducibility.

The above problem will be discussed in more detail below with reference to FIGS. 26C and 26D. FIG. 26C shows an example of blocks of shape data formed in the boundary macroblock, and FIG. 26D shows chroma data after padding at that time. In FIG. 26D, pixels C1, C3, C5, C6, and C7 may suffer the aforementioned problem.

In pixel C1, since the ratio of data inside and outside the object is 2:2 with respect to four shape data, chroma data is obtained by mixing colors inside and outside the object at 50% each. Likewise, in pixel C3, since the ratio of data inside and outside the object is 3:1, the color inside the object is 75% and the influence is small. However, in pixel C5, since the ratio of data inside and outside the object is 1:3, the color inside the object is only 25%. This poses a serious problem on coding efficiency and color reproducibility.

In pixel C1, since the color outside the object occupies 50%, data continuity with pixel C2 is impaired. Also, since C1 data is repetitively copied as horizontal padding data, the edge between pixels C1 and C2 becomes a high-frequency component, thus lowering the coding efficiency. Furthermore, in pixel C5, since the color inside the object is only 25%, the gap becomes larger, and a high-frequency component is highly likely to be generated.

Upon synthesizing the extracted object with another background data, 50% background data and 50% object data are to be synthesized at the position of pixel C1. However, since object data is selected intact, it is synthesized while containing 50% background data upon extraction. Furthermore, at the position of pixel C5, since the color inside the object is contained at only 25%, the synthesized image contains 75% background color upon extraction, resulting in unnatural color reproduction different from the original object color.

Object Encoding Apparatus

Figure 11:
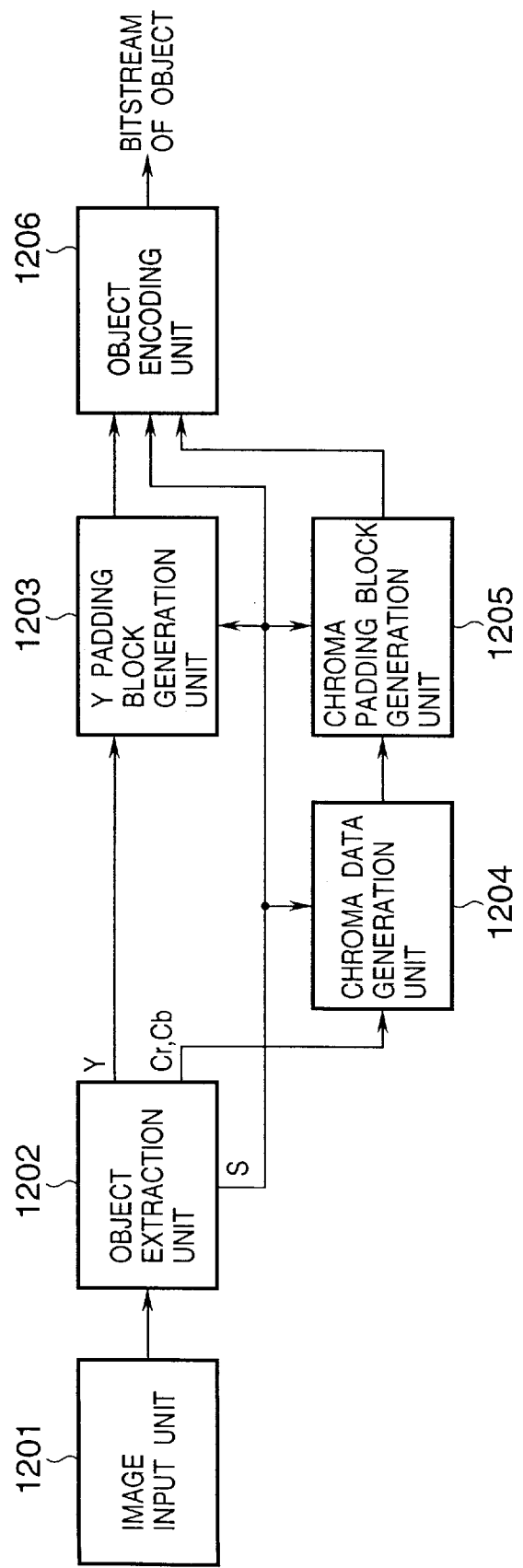
FIG. 11 is a block diagram showing the arrangement of an image processing apparatus according to the third embodiment of the present invention.

FIG. 11 is a block diagram showing the overall arrangement of an image processing apparatus that implements object encoding according to the third embodiment.

An image input unit 1201 performs data matching in correspondence with the image format to be processed. For example, when the input image is an analog signal, the image input unit 1201 performs A/D conversion; when the input image is RGB data, it performs YCbCr conversion. Alternatively, the image input unit 1201 performs processes such as 4:2:0 format conversion by a chroma subsampling process.

An object extraction unit 1202 detects a region where the object is present, and generates shape data. The object extraction unit 1202 forms a bounding box on the basis of the shape defined by the shape data, and generates macroblocks. As object extraction methods, a threshold value process using chroma-keying, a method using a dynamic edge model, and the like are available. However, since this embodiment is independent from such extraction methods, object extraction may be done by any method.

A Y padding block generation unit 1203 implements padding of Y data in units of macroblocks. If all data within a given macroblock are located inside the object, no padding is required. That is, padding is done for only boundary macroblocks, macroblocks to be subjected to expanded padding, and macroblocks to be subjected to constant value padding.

A chroma data generation unit 1204 generates new data for boundary macroblocks in which chroma data extend across the boundary of the object. The process in the chroma data generation unit 1204 will be described in detail later.

A chroma padding block generation unit 1205 implements padding of chroma data in units of macroblocks. If all data within a given macroblock are located inside the object, no padding is required. That is, padding is done for only boundary macroblocks, macroblocks to be subjected to expanded padding, and macroblocks to be subjected to constant value padding. Note that the data generated by the chroma data generation unit 1204 are used in boundary macroblocks in which chroma data extend across the boundary of the object. The process in the chroma padding block generation unit 1205 will be described in detail later.

Upon completion of padding for all macroblocks, an object encoding unit 1206 executes an encoding process. Y (luminance) and chroma (color difference) texture data undergo processes such as DCT, quantization, variable-length coding, and the like. Shape data undergo arithmetic coding called CAE (Context-based Arithmetic Encoding). Note that the object encoding unit 1206 generates a stream of one video object, and multiplexing is required after this unit if a plurality of streams are to be processed.

Outline of Chroma Data Generation Process

Chroma data generation and padding process in the chroma data generation unit 1204 and chroma padding block generation unit 1205 will be described in detail below with reference to the flow chart shown in FIG. 12.

Figure 12:
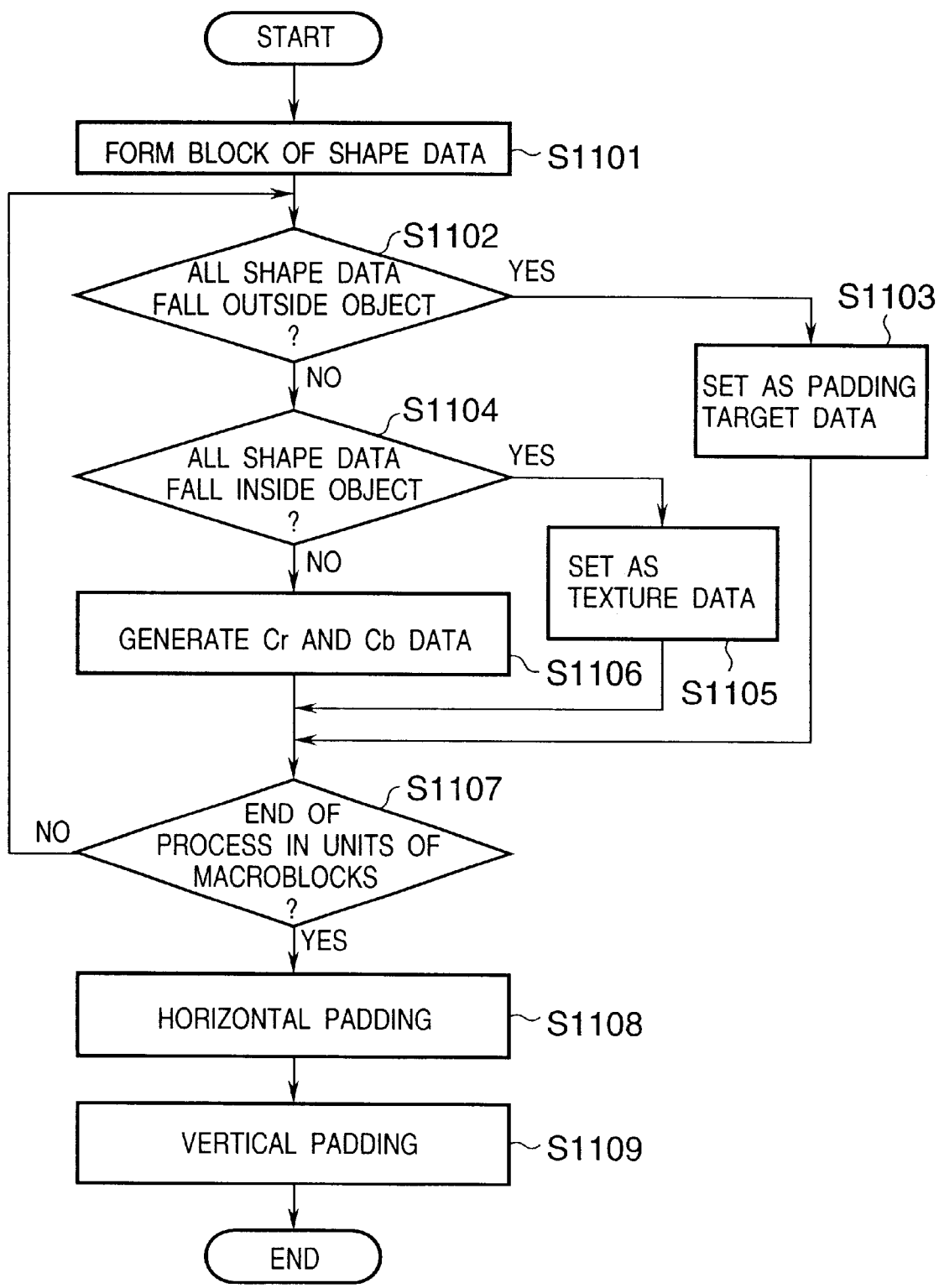
FIG. 12 is a flow chart showing a chroma data generation process.

Chroma data in this embodiment are processed in units of macroblocks in accordance with the flow chart shown in FIG. 12.

In step S1101, blocks are formed in units of four pixels of shape data. It is then checked in step S1102 if all shape data in the block of interest are located outside the object. If YES in step S1102, that block is set as padding target data in step S1103.

On the other hand, if at least one shape data is located inside the object, it is checked in step S1104 if all the shape data are located inside the object. If YES in step S1104, that block is set as texture data (chroma data itself of the object) in step S1105.

If NO is determined in a given block in both steps S1102 and S1104, this means that chroma data extends across the boundary of the object. For such block, chroma data is generated in step S1106. Since the details of the chroma data generation process in step S1106 is the same as the chroma data setup process at the object boundary, that has been explained in the second embodiment with reference to FIGS. 7 to 9C, a detailed description thereof will be omitted. That is, the chroma value of a target pixel is calculated as the average of chroma values of valid surrounding pixels, which are weighted based on their distances.

Note that the chroma value of the target pixel may be set to be equal to the value of one of the valid surrounding pixels, which is closest to the target pixel. For example, in the example shown in FIG. 26D, the value of pixel C1 becomes equal to that of C2, and all horizontal padding data in this line become equal to C2. Likewise, the value of pixel C3 becomes equal to that of C4, and all horizontal padding data in this line become equal to C4. In this manner, further improvement of the coding efficiency can be expected.

It is checked in step S1107 if the processes are complete for all pixels in a given macroblock, and the processes in steps S1102 to S1107 are repeated until they are completed for all the pixels. Upon completion of the processes for all the pixels in the macroblock, padding is executed for padding target data set in step S1103. That is, horizontal padding is done in step S1108, and vertical padding is then done in step S1109. With this process, all chroma data in the macroblock are determined.

With the aforementioned method, chroma data can be generated without including any color outside the object. Hence, since the gap between chroma data that extends across the object boundary and neighboring chroma data inside the object can be reduced, the coding efficiency in the object encoding unit 208 can be improved.

As described above, according to this embodiment, upon extracting an object from a chroma-subsampled image, since the value of a chroma pixel that extends across the object boundary is calculated based on the chroma values of surrounding pixels, the coding efficiency of chroma data can be improved.

Fourth Embodiment

The fourth embodiment of the present invention will be explained below.

The fourth embodiment will exemplify a case wherein the object encoded by the third embodiment is decoded and is synthesized with a background image.

General Object Synthesis Process

A general object synthesis process for synthesizing an object extracted according to MPEG4 with another image (background data) will be described in detail below. The object synthesis process can basically take a procedure reverse to the object extraction process. In this embodiment, only the synthesis process of a boundary macroblock will be explained.

Figure 13:
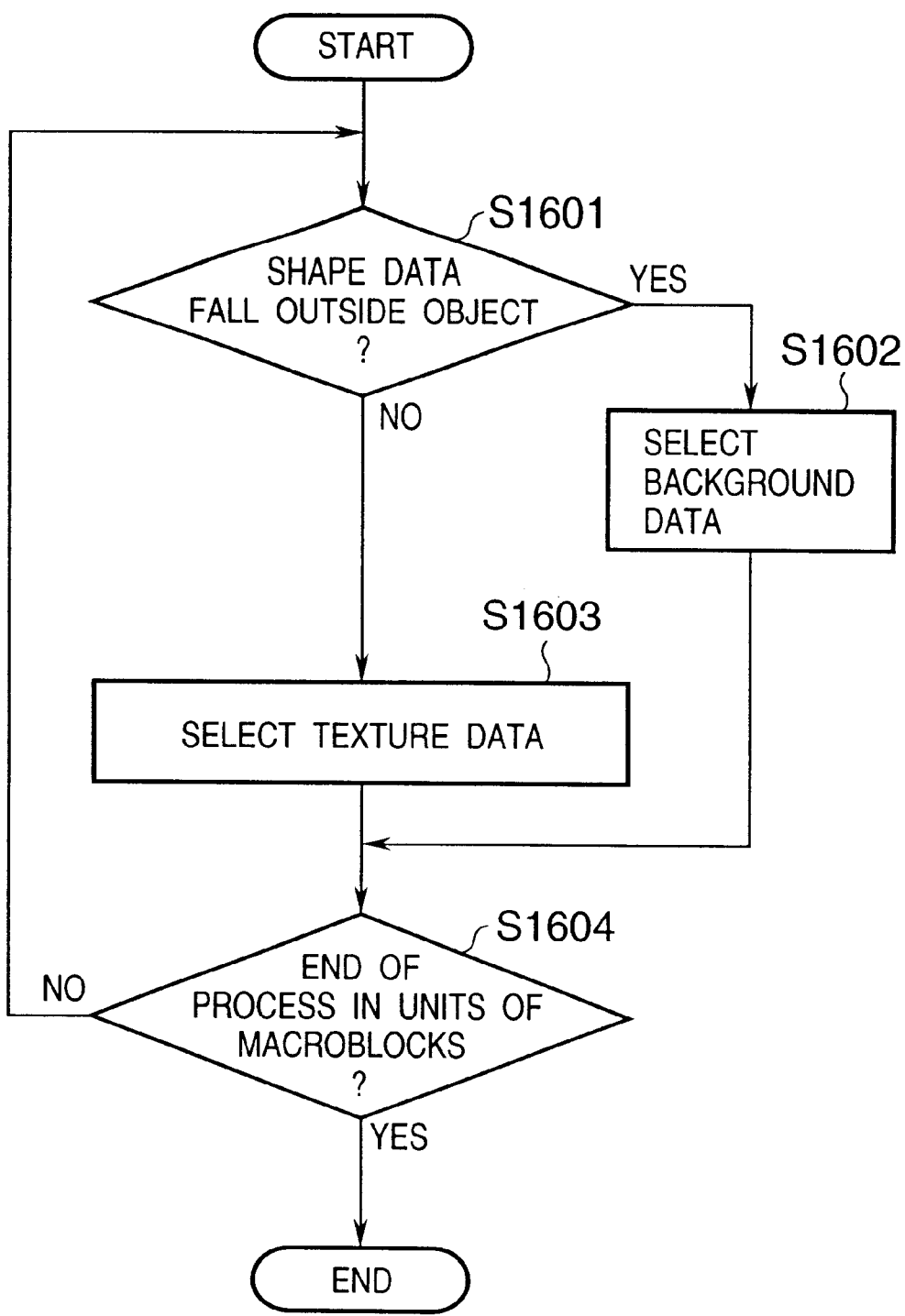
FIG. 13 is a flow chart showing a Y data synthesis process.

FIG. 13 is a flow chart showing an example of the Y data synthesis process. Since the resolution of shape data matches that of Y data, discrimination can be made in units of pixels. It is checked in step S1601 if shape data is located outside the object. If YES in step S1601, background data is selected in step S1602. On the other hand, if NO in step S1601, texture data (object data) is directly selected in step S1603. Upon completion of the process for all data in a given macroblock (S1604), this synthesis process ends.

Figure 14:
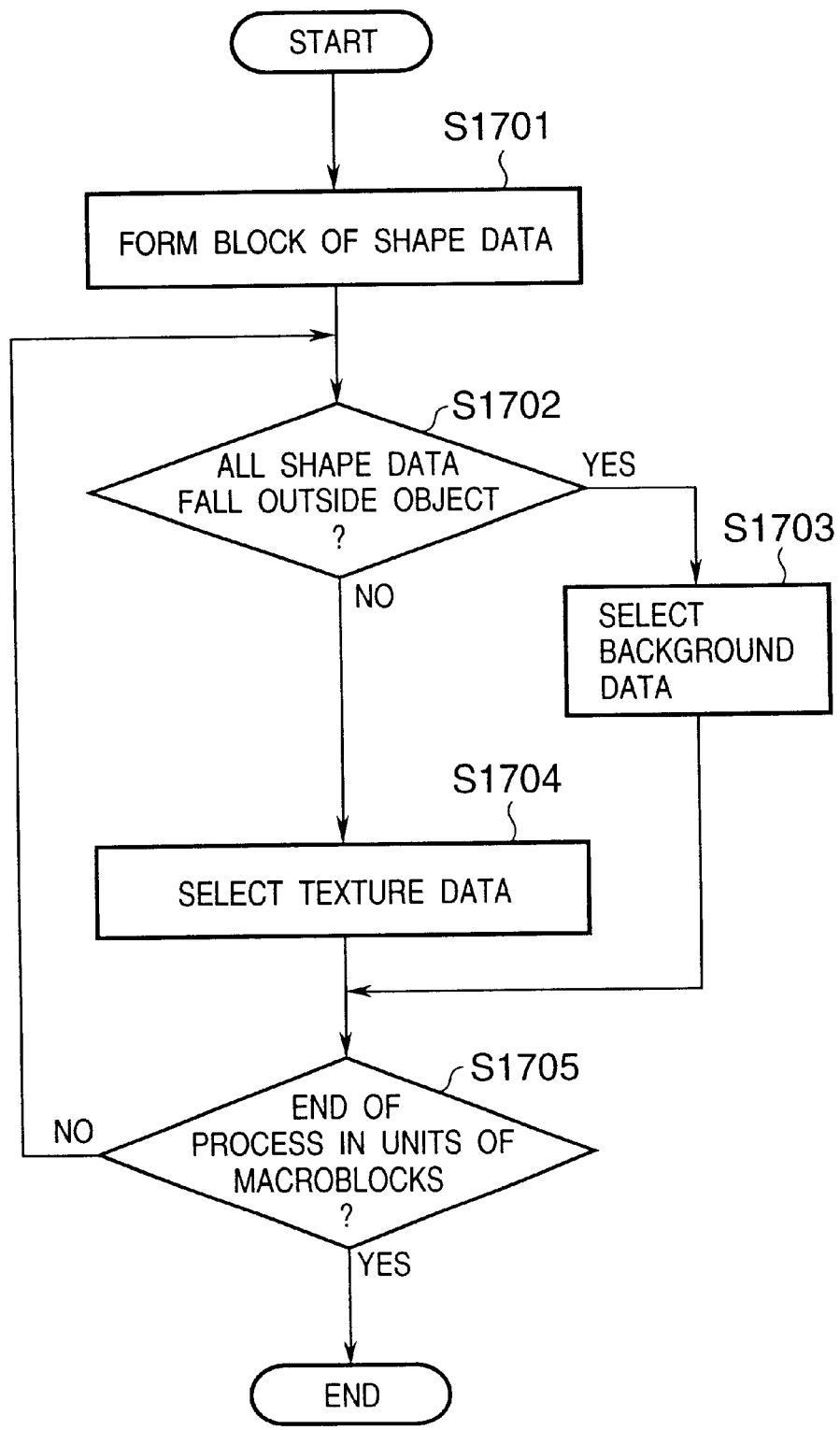
FIG. 14 is a flow chart showing a chroma data synthesis process.

FIG. 14 is a flow chart showing an example of the chroma data synthesis process. Since both the horizontal and vertical resolutions of chroma data are half those of shape data, one chroma pixel is discriminated per four pixels of shape data. In step S1701, a block of four pixels of shape data is formed. It is then checked in step S1702 if all four shape data in the block of interest are located outside the object. If YES in step S1702, background data is selected in step S1703. On the other hand, if it is determined in step S1702 that at least one shape data is located inside the object, texture data (object data) is directly selected in step S1704. Upon completion of discrimination for all pixels in a given macroblock (S1705), this synthesis process ends.

As described above, since the decoder side synthesizes texture data by a process reverse to that on the encoder side, padding data are replaced by background data on the decoder side.

Object Synthesis Apparatus

Figure 15:
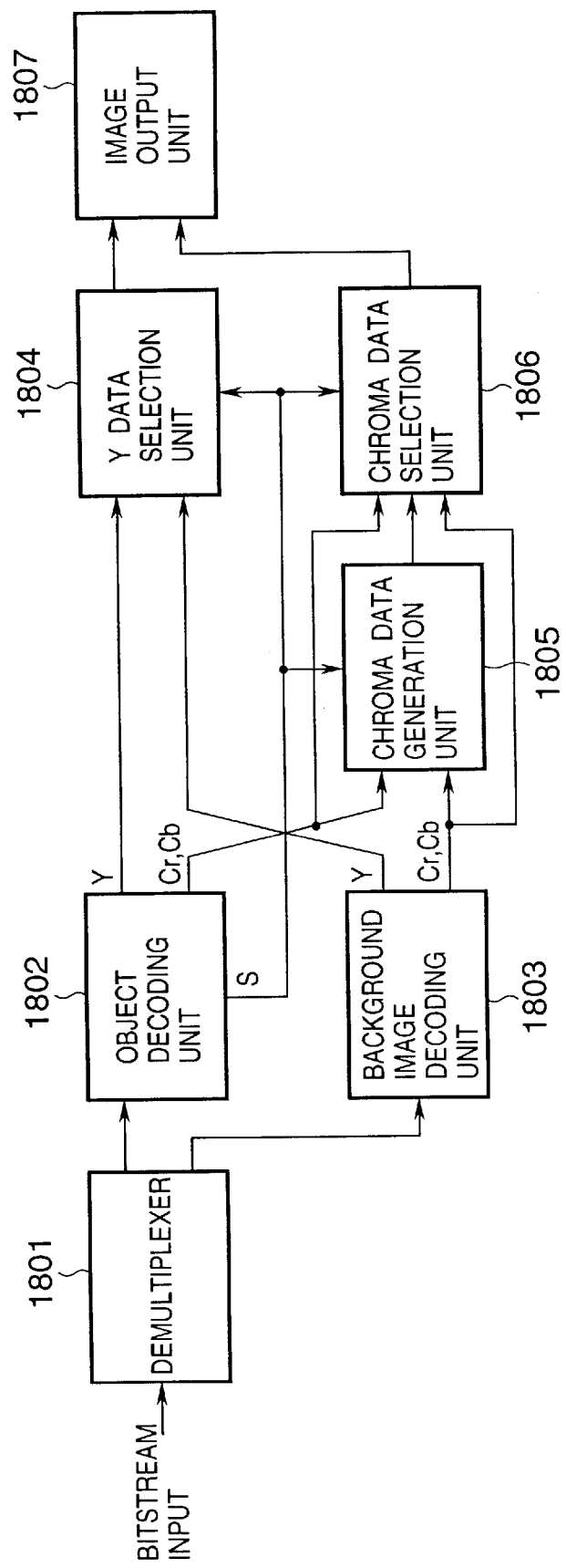
FIG. 15 is a block diagram showing the arrangement of an image processing apparatus according to the fourth embodiment of the present invention.

FIG. 15 is a block diagram showing the overall arrangement of an image processing apparatus that decodes and synthesizes an object in the fourth embodiment.

A demultiplexer 1801 demultiplexes a multiplexed bitstream. In this case, the multiplexed bitstream contains two types of data, i.e., data pertaining to a background image, and data pertaining to an image object. The stream data demultiplexed by the demultiplexer 1801 are respectively sent to an object decoding unit 1802 and background image decoding unit 1803.

The object decoding unit 1802 decodes texture data in units of macroblocks via processes such as variable-length decoding, dequantization, inverse DCT, and the like. Also, the unit 1802 decodes shape data in units of macroblocks via processes such as arithmetic decoding and the like. The background image decoding unit 1803 decodes background image data via the same decoding processes.

A Y data selection unit 1804 selects based on the value of shape data if Y data of the object or background is used as texture data.

A chroma data generation unit 1805 generates new chroma data for boundary macroblocks in which chroma data extend across the boundary of the object. The process in the chroma data generation unit 1805 will be described in detail later.

A chroma data selection unit 1806 selects based on the value of shape data if chroma data of the object or background, or data generated by the chroma data generation unit 1805 is used as texture data. The process in the chroma data selection unit 1806 will be described in detail later.

An image output unit 1807 executes a process for converting data synthesized upon selection in the Y data selection unit 1804 and chroma data selection unit 1806 into an output format. For example, the unit 1807 executes processes such as an upsampling process of subsampled data, RGB conversion of YCbCr data, D/A conversion upon generating an analog output, and the like.

Object Synthesis Process

Figure 16:
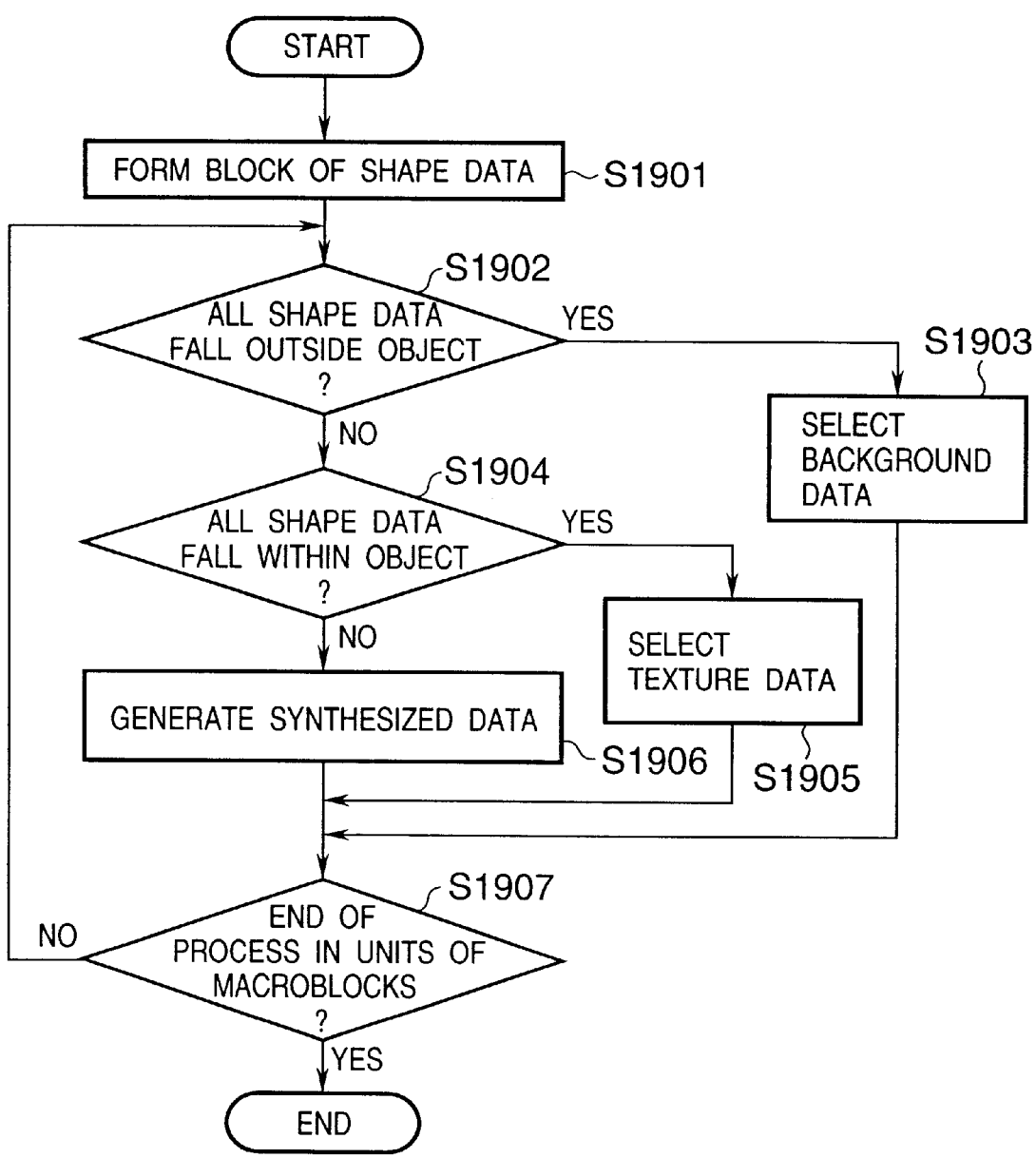
FIG. 16 is a flow chart showing an object synthesis process.

FIG. 16 is a flow chart showing especially the process that pertains to chroma data in the object synthesis process in the fourth embodiment.

In step S1901, a block formation process for forming blocks in units of four pixels of shape data is executed. It is then checked in step S1902 if all four shape data in the block of interest are located outside the object. If YES in step S1902, chroma data of the background is selected in step S1903. On the other hand, if it is determined in step S1902 that at least one shape data is located inside the object, it is checked in step S1904 if all the shape data are located within the object. If YES in step S1904, texture data (chroma data itself of the object) is selected in step S1905.

If NO is determined in a given block in both steps S1902 and S1904, this means that chroma data extends across the boundary of the object. For such block, chroma data is generated in step S1906. Note that this discrimination is made in the chroma data selection unit 1806.

It is checked in step S1907 if the processes are complete for all pixels in a given macroblock, and the processes in steps S1902 to S1907 are repeated until they are completed for all the pixels. Upon completion of the processes for all the pixels in the macroblock, all chroma data in the macroblock are determined.

Chroma Data Synthesis Process

The chroma data synthesis process in step S1906 above is done by the chroma data generation unit 1805. Since this synthesis process is done on the basis of the ratio between the object and background in a given block in the same manner as the process that has been explained in the second embodiment using FIG. 10, a detailed description thereof will be omitted. That is, chroma data are synthesized based on equation (2).

As described above, according to the fourth embodiment, in the object synthesis process, since chroma data that extend across the boundary are synthesized on the basis of the ratio between the background and object data, natural color reproduction can be realized.

Note that the fourth embodiment can be practiced independently of the third embodiment described above. Also, by adopting the third embodiment on the object encoder side, and the fourth embodiment on the decoder side, color reproducibility after synthesis can be further improved.

Another Embodiment

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the aforementioned flow charts.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    object input means for inputting image data which represents an object;
    shape generation means for generating shape data which represents a shape of the object from the image data;
    texture generation means for generating first texture data which represents luminance of the object, and second texture data which has a resolution lower than the shape data and represents color difference of the object from the image data;
    target image input means for inputting target image data with which the object is to be synthesized; and
    synthesis means for generating new second texture data using surrounding data of the second texture data in the object boundary portion, which portion includes the inside and the outside of the object defined by the shape data, and synthesizing the first and the new second texture data with the target image data on the basis of the shape data.

2. The apparatus according to claim 1, wherein said synthesis means generates the second texture data of the boundary portion of the object on the basis of a ratio of the shape data included inside the object in the object in the object boundary portion.

3. The apparatus according to claim 1, wherein said synthesis means detects the object boundary portion on the basis of the shape data.

4. The apparatus according to claim 1, wherein said synthesis means selects the first and second texture data when the shape data indicates a position inside the object, selects the target image data when the shape data indicates a position outside the object, and generates the new second texture data when the shape data indicates an object boundary portion.

5. The apparatus according to claim 1, wherein the shape data and first texture data have the same resolution.

6. The apparatus according to claim 5, wherein the shape data has a resolution four times a resolution of the second texture data.

7. The apparatus according to claim 1, wherein said shape generation means decodes encoded shape data in the image data, and
    said texture generation means decodes encoded first and second texture data in the image data.

8. The apparatus according to claim 1, wherein said target image input means decodes encoded target image data.

9. The apparatus according to claim 1, further comprising:
    input means for inputting a multiplexed signal of the image data that represents the object and the target image data, and
    wherein said input means demultiplexes the signal, and distributes the image data and target image data to said object input means and said target image input means, respectively.

10. An image processing method comprising the steps of:
    inputting image data which represents an object;
    generating shape data which represents a shape of the object from the image data;
    generating first texture data which represents luminance of the object, and second texture data which has a resolution lower than the shape data and represents color difference of the object from the image data;
    inputting target image data with which the object is to be synthesized; and
    generating new second texture data using surrounding data of the second texture data in the object boundary portion, which portion includes the inside and the outside of the object defined by the shape data, and synthesizing the first and the new second texture data with the target image data on the basis of the shape data.

11. The method according to claim 10, wherein the synthesis step generates the second texture data of the boundary portion of the object on the basis of a ratio of the shape data included inside the object in the object boundary portion.

12. The method according to claim 11, wherein the synthesis step includes:
    the block formation step of segmenting the shape data into blocks;
    the discrimination step of discriminating if shape data in a block of interest indicates an object boundary portion; and
    the generation step of generating the second texture data corresponding to the block of interest when the block of interest indicates an object boundary portion.

13. The method according to claim 12, wherein the generation step further includes:
    the calculation step of calculating a ratio of shape data in the block of interest, which are located inside the object; and
    the synthesis step of synthesizing the second texture data and the target image data corresponding to the block of interest on the basis of the ratio.

* * * * *

UNITED STATES PATENT AND TRADEMARK OFFICE
CERTIFICATE OF CORRECTION

PATENT NO. : 6,636,644 B1
DATED : October 21, 2003
INVENTOR(S) : Osamu Itokawa

It is certified that error appears in the above-identified patent and that said Letters Patent is hereby corrected as shown below:

Title page,
Item [73], Assignee, "Canon Kabushiki Kaishi, Tokyo (JP)" should read
-- Canon Kabushiki Kaisha, Tokyo (JP) --.
Item [57], ABSTRACT,
Line 4, "lowers." should read -- decreases. --; and
Line 7, "pixels" should read -- pixel --.

Column 1,
Line 35, "includes" should read -- include --.

Column 2,
Line 27, "lowers." should read -- decreases. --.

Column 4,
Line 35, "•Boundary" should read -- ¶ Boundary --.

Column 6,
Line 66, "word," should read -- words, --.

Column 11,
Line 1, "at" should read -- as --.

Column 17,
Line 50, "in the object" should be deleted.

Signed and Sealed this

Fourteenth Day of February, 2006

JON W. DUDAS
*Director of the United States Patent and Trademark Office*